US011887438B2

(12) United States Patent
Cohn et al.

(10) Patent No.: US 11,887,438 B2
(45) **Date of Patent: *Jan. 30, 2024**

(54) GAMING MACHINE AND METHOD WITH PERSISTENCE FEATURE

(71) Applicant: LNW Gaming, Inc., Las Vegas, NV (US)

(72) Inventors: Kimberly Cohn, Las Vegas, NV (US); Jamie Knight, Henderson, NV (US); Richard Milosevich, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,668

(22) Filed: Dec. 6, 2022

(65) Prior Publication Data

US 2023/0104976 A1 Apr. 6, 2023

Related U.S. Application Data

(63) Continuation of application No. 17/238,308, filed on Apr. 23, 2021, now Pat. No. 11,551,527.

(Continued)

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC .. G07F 17/3213; G07F 17/3267; G07F 17/34; G07F 17/3244
See application file for complete search history.

(56) References Cited

U.S. PATENT DOCUMENTS 3,733,075 A 5/1973 Hooker et al.
5,342,047 A 8/1994 Heidel et al.
(Continued)

FOREIGN PATENT DOCUMENTS

AU 2015210489 A1 2/2016
AU 2019226167 A1 3/2020
(Continued)

OTHER PUBLICATIONS

Zodiac Lion Class III Slot Game; IGT; Casino Journal, Mar. 5, 2020.

(Continued)

*Primary Examiner* — Justin L Myhr

(57) ABSTRACT

A gaming machine includes an electronic display device configured to display an array of symbol positions and registers. The registers are associated with respective subsets of one or more of the symbol positions of the array. Game-logic circuitry directs the display device to animate a plurality of spins of symbol-bearing reels wherein, in each spin, the reels are spun and stopped to land symbols in the array. The plurality of symbols include value-bearing symbols, redemption symbols, and reset symbols. For each landed value-bearing symbol, the symbol value is added to the applicable register. In response to accumulating a predetermined number of the redemption symbols in a subset, the value in that subset's register is awarded. In response to the reset symbol landing in a subset, the value in that subset's register is reset.

21 Claims, 22 Drawing Sheets

Related U.S. Application Data

(60) Provisional application No. 63/027,482, filed on May 20, 2020.

(56) References Cited

U.S. PATENT DOCUMENTS

| | | | |
|---|---|---|---|
| 5,356,140 | A | 10/1994 | Dabrowski et al. |
| 5,393,061 | A | 2/1995 | Manship et al. |
| 5,704,835 | A | 1/1998 | Dietz |
| 5,833,537 | A | 11/1998 | Barrie |
| 5,951,397 | A | 9/1999 | Dickinson |
| 6,027,115 | A | 2/2000 | Griswold et al. |
| 6,056,642 | A | 5/2000 | Bennett |
| 6,089,977 | A | 7/2000 | Bennett |
| 6,224,482 | B1 | 5/2001 | Bennett |
| 6,251,013 | B1 | 6/2001 | Bennett |
| 6,270,411 | B1 | 8/2001 | Gura et al. |
| 6,290,600 | B1 | 9/2001 | Glasson |
| 6,517,432 | B1 | 2/2003 | Jaffe |
| 6,551,187 | B1 | 4/2003 | Jaffe |
| 6,561,900 | B1 | 5/2003 | Baerlocher et al. |
| 6,641,477 | B1 | 11/2003 | Dietz |
| 6,657,923 | B2 | 12/2003 | Laughlin |
| 6,731,313 | B1 | 5/2004 | Kaminkow |
| 6,786,818 | B1 | 9/2004 | Rothschild et al. |
| 6,837,790 | B1 | 1/2005 | Kaminkow |
| 6,910,962 | B2 | 6/2005 | Marks et al. |
| 7,018,293 | B2 | 3/2006 | Brown et al. |
| 7,029,396 | B2 | 4/2006 | Jaffe et al. |
| 7,121,945 | B2 | 10/2006 | Suganuma et al. |
| 7,179,169 | B2 | 2/2007 | Beaulieu et al. |
| 7,252,591 | B2 | 8/2007 | Van Asdale |
| 7,458,890 | B2 | 12/2008 | Loose et al. |
| 7,503,847 | B2 | 3/2009 | Baerlocher |
| 7,553,231 | B2 | 6/2009 | Rodgers et al. |
| 7,604,538 | B2 | 10/2009 | Pacey |
| 7,980,936 | B2 | 7/2011 | Mead |
| 8,083,581 | B2 | 12/2011 | Marks et al. |
| 8,105,151 | B2 | 1/2012 | Caputo et al. |
| 8,162,741 | B2 | 4/2012 | Wadleigh et al. |
| 8,192,275 | B2 | 6/2012 | Aoki et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,608,545 | B2 | 12/2013 | Arora et al. |
| 8,662,986 | B2 | 3/2014 | Rodgers et al. |
| 8,690,660 | B2 | 4/2014 | Saunders et al. |
| 8,696,434 | B2 | 4/2014 | Tsukahara |
| 8,790,169 | B2 | 7/2014 | Saunders |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,165,433 | B2 | 10/2015 | Caputo |
| 9,202,345 | B2 | 12/2015 | Zoltewicz et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,633,506 | B2 | 4/2017 | Basallo et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,204,473 | B2 | 2/2019 | Lenger |
| 10,339,761 | B2 | 7/2019 | Olive |
| 10,366,575 | B2 | 7/2019 | Visser |
| 10,388,112 | B2 | 8/2019 | You et al. |
| 10,417,877 | B2 | 9/2019 | Gomez et al. |
| 10,475,294 | B2 | 11/2019 | Gomez et al. |
| 10,643,431 | B2 | 5/2020 | Chesworth et al. |
| 10,672,220 | B2 | 6/2020 | Lenger |
| 10,706,664 | B2 | 7/2020 | Boese et al. |
| 10,769,888 | B2 | 9/2020 | You et al. |
| 2002/0119818 | A1 | 8/2002 | Savio et al. |
| 2003/0035346 | A1 | 2/2003 | Laughlin |
| 2003/0130034 | A1 | 7/2003 | Suganuma et al. |
| 2003/0157980 | A1 | 8/2003 | Loose et al. |
| 2003/0216165 | A1 | 11/2003 | Singer et al. |
| 2004/0023714 | A1 | 2/2004 | Asdale |
| 2004/0043815 | A1 | 3/2004 | Kaminkow |
| 2004/0137982 | A1 | 7/2004 | Cuddy et al. |
| 2004/0171417 | A1 | 9/2004 | Beaulieu et al. |
| 2006/0189369 | A1 | 8/2006 | Taylor |
| 2007/0060248 | A1 | 3/2007 | Rodgers et al. |
| 2007/0060275 | A1 | 3/2007 | Gilmore et al. |
| 2007/0129135 | A1 | 6/2007 | Marks et al. |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108431 | A1 | 5/2008 | Cuddy et al. |
| 2009/0124326 | A1 | 5/2009 | Caputo et al. |
| 2009/0124391 | A1 | 5/2009 | Nelson et al. |
| 2009/0239634 | A1 | 9/2009 | Nguyen |
| 2009/0291741 | A1 | 11/2009 | Schofield |
| 2010/0016055 | A1 | 1/2010 | Englman |
| 2010/0075737 | A1 | 3/2010 | Bluemel |
| 2010/0167815 | A1 | 7/2010 | Gagner et al. |
| 2010/0234092 | A1 | 9/2010 | Gomez et al. |
| 2010/0304832 | A1 | 12/2010 | Kup-Ferroth |
| 2011/0111824 | A1 | 5/2011 | Cuddy et al. |
| 2011/0230251 | A1 | 9/2011 | Nicely et al. |
| 2012/0122532 | A1 | 5/2012 | Berman et al. |
| 2012/0178517 | A1 | 7/2012 | Montenegro et al. |
| 2014/0014186 | A1 | 1/2014 | Bhattacharya et al. |
| 2014/0141860 | A1 | 5/2014 | Meyer |
| 2014/0179396 | A1 | 6/2014 | Aoki et al. |
| 2014/0274292 | A1 | 9/2014 | Suda |
| 2014/0323198 | A1 | 10/2014 | Tuck |
| 2015/0031437 | A1 | 1/2015 | Gomez et al. |
| 2015/0170462 | A1 | 6/2015 | Berman et al. |
| 2015/0269809 | A1 | 9/2015 | Smith |
| 2015/0287269 | A1 | 10/2015 | Berman |
| 2015/0356833 | A1 | 12/2015 | Aoki et al. |
| 2016/0042597 | A1 | 2/2016 | Olive |
| 2016/0049037 | A1 | 2/2016 | Kroon |
| 2017/0092070 | A1 | 3/2017 | Marston et al. |
| 2017/0154498 | A1 | 6/2017 | Olive |
| 2017/0309119 | A1 | 10/2017 | San |
| 2017/0372558 | A1 | 12/2017 | You et al. |
| 2018/0268655 | A1 | 9/2018 | Olive |
| 2018/0268659 | A1 | 9/2018 | Chesworth et al. |
| 2019/0236905 | A1 | 8/2019 | Washington et al. |
| 2019/0295377 | A1 | 9/2019 | Suda et al. |
| 2019/0304244 | A1 | 10/2019 | Kennedy et al. |
| 2019/0340880 | A1 | 11/2019 | You et al. |
| 2019/0347908 | A1 | 11/2019 | Bolling, Jr. |
| 2019/0385407 | A1 | 12/2019 | Hiten et al. |
| 2020/0090467 | A1 | 3/2020 | Marks et al. |
| 2020/0250923 | A1 | 8/2020 | Ceniceroz et al. |
| 2020/0279457 | A1 | 9/2020 | Chesworth et al. |

(56) References Cited

U.S. PATENT DOCUMENTS

| | | | |
|---|---|---|---|
| 2020/0312094 | A1 | 10/2020 | Halvorson et al. |
| 2020/0364982 | A1 | 11/2020 | You et al. |
| 2021/0279999 | A1 | 9/2021 | Meyer |

FOREIGN PATENT DOCUMENTS

| | | | |
|---|---|---|---|
| GB | 2097160 | A | 10/1982 |
| GB | 2144568 | A | 3/1985 |
| GB | 2251112 | A | 6/1992 |
| WO | 2008024705 | A2 | 2/2008 |

OTHER PUBLICATIONS

Zodiac Lion Slot Machine Snapshots from YouTube Video posted Aug. 15, 2019.
Examination Report for AU Application No. 2021203151, dated Mar. 28, 2022, 6 pages.
Examination Report for AU Application No. 2021203150, dated Apr. 1, 2022, 6 pages.
Examination Report for AU Application No. 2021203152, dated May 15, 2022, 6 pages.

GAMING MACHINE AND METHOD WITH PERSISTENCE FEATURE

CROSS-REFERENCE TO RELATED APPLICATIONS

This application is a continuation of U.S. patent application Ser. No. 17/238,308, filed Apr. 23, 2021, which claims the benefit of priority to U.S. Provisional Patent Application No. 63/027,482, filed May 20, 2020, both the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, SG Gaming, Inc.

FIELD OF THE INVENTION

The present invention relates to a technological improvement to gaming systems, apparatus, and methods and, more particularly, to new and improved animations in connection with a symbol array persistence feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system and a method of operating a gaming system. The gaming system comprises a gaming machine and game-logic circuitry for operating the machine. The gaining machine includes an electronic display device configured to display an array of symbol positions and registers. The registers are associated with respective subsets of one or more of the symbol positions of the array.

The game-logic circuitry directs the display device to animate a plurality of spins of symbol-bearing reels wherein, in each spin, the symbol-bearing reels are spun and stopped to land a plurality of symbols borne by the reels in the array. The plurality of symbols include value-bearing symbols. For each value-bearing symbol in the plurality of symbols, a value borne by the value-bearing symbol is added to the register associated with the subset containing the symbol position in which the value-bearing symbol landed.

In some embodiments, the plurality of symbols also include redemption symbols and reset symbols. In response to accumulating a predetermined number of the redemption symbols in a subset, the value in the register associated with that subset is awarded. In response to the reset symbol landing in that subset, the value in the register associated with that subset is reset.

In other embodiments, the array is animated to tag the symbol position in which each value-bearing symbol lands. In response to tagging all the symbol positions in a subset, the value in the register associated with that subset is awarded. In response to none of the value-bearing symbols landing in that subset during any one of the plurality of spins, the value in the register associated with that subset is reset, and the array is animated to untag all the symbol positions in that subset.

In further embodiments, landing value-bearing symbols in a subset of the array causes a counter associated with the subset to be activated. The landed value-bearing symbols are locked in the subset until either the counter meets a termination count or an award condition of the subset, such as filling every symbol position of the subset with value-bearing symbols, is met. If the termination count is met, the locked value-bearing symbols are removed without awarding the values indicated by the value-bearing symbols. However, if the award conditions are met, the values of the locked value-bearing symbols within the subset are awarded.

Additional aspects of the invention will be apparent to those of ordinary skill in the art in view of the detailed description of various embodiments, which is made with reference to the drawings, a brief description of which is provided below.

Figure 1:
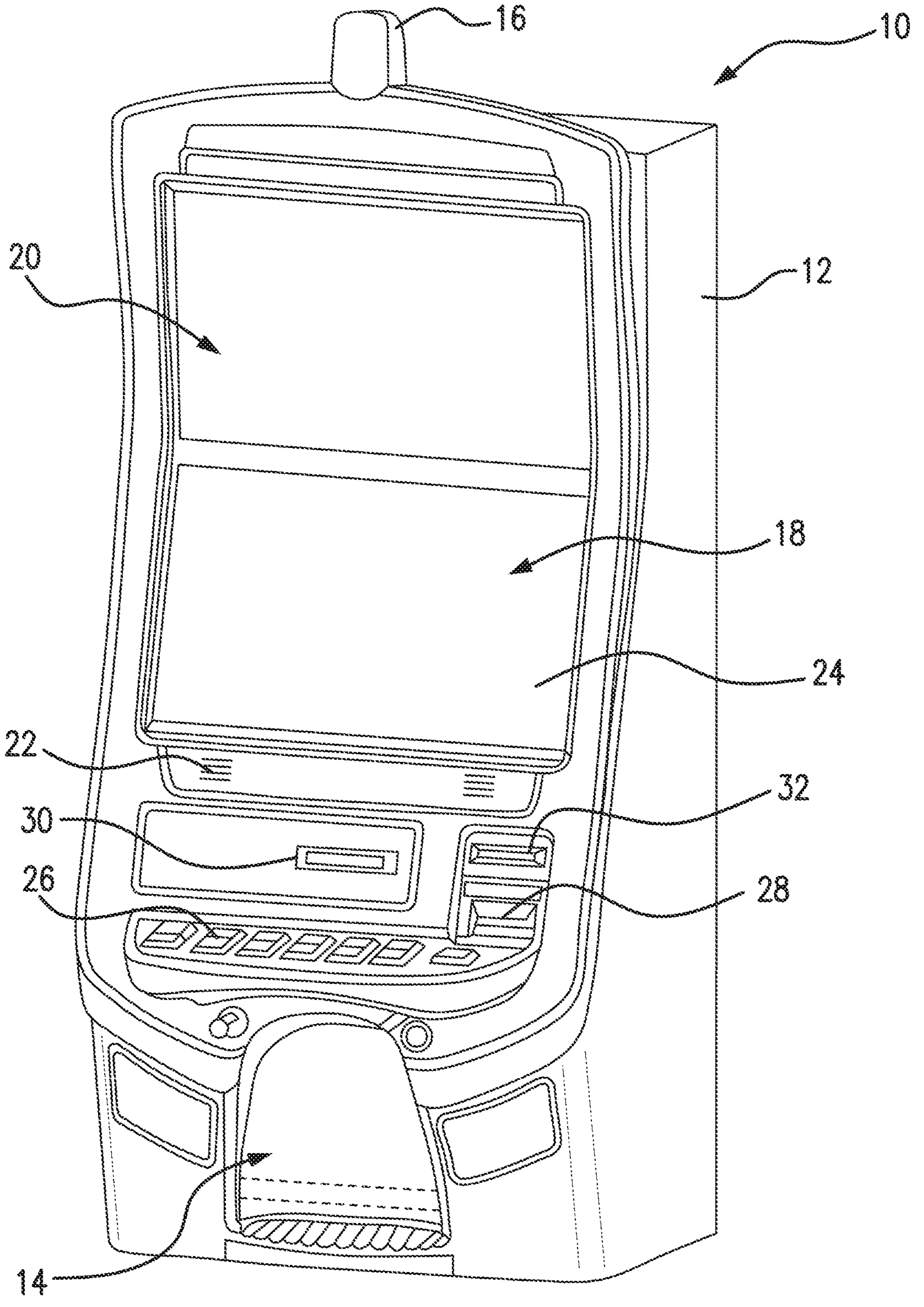
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Embodiments may be combined with aspects of one embodiment supplementing or replacing aspects of another embodiment. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct an electronic display device to present a symbol-value aggregation process that minimizes processing overhead by utilizing numbered indicia to represent credit values instead of complex, fanciful game images. Further, the process aggregates displayed values borne by special symbols (i.e., value-bearing symbols) according to stored, variable criteria. In this way, the value-bearing symbols provide building blocks for innumerable different aggregation sequences simply by manipulating the aggregation criteria associated with the value-bearing symbols, resulting in fewer rules needed for the aggregation process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-aggregation process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the “credits” meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the “credits” meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
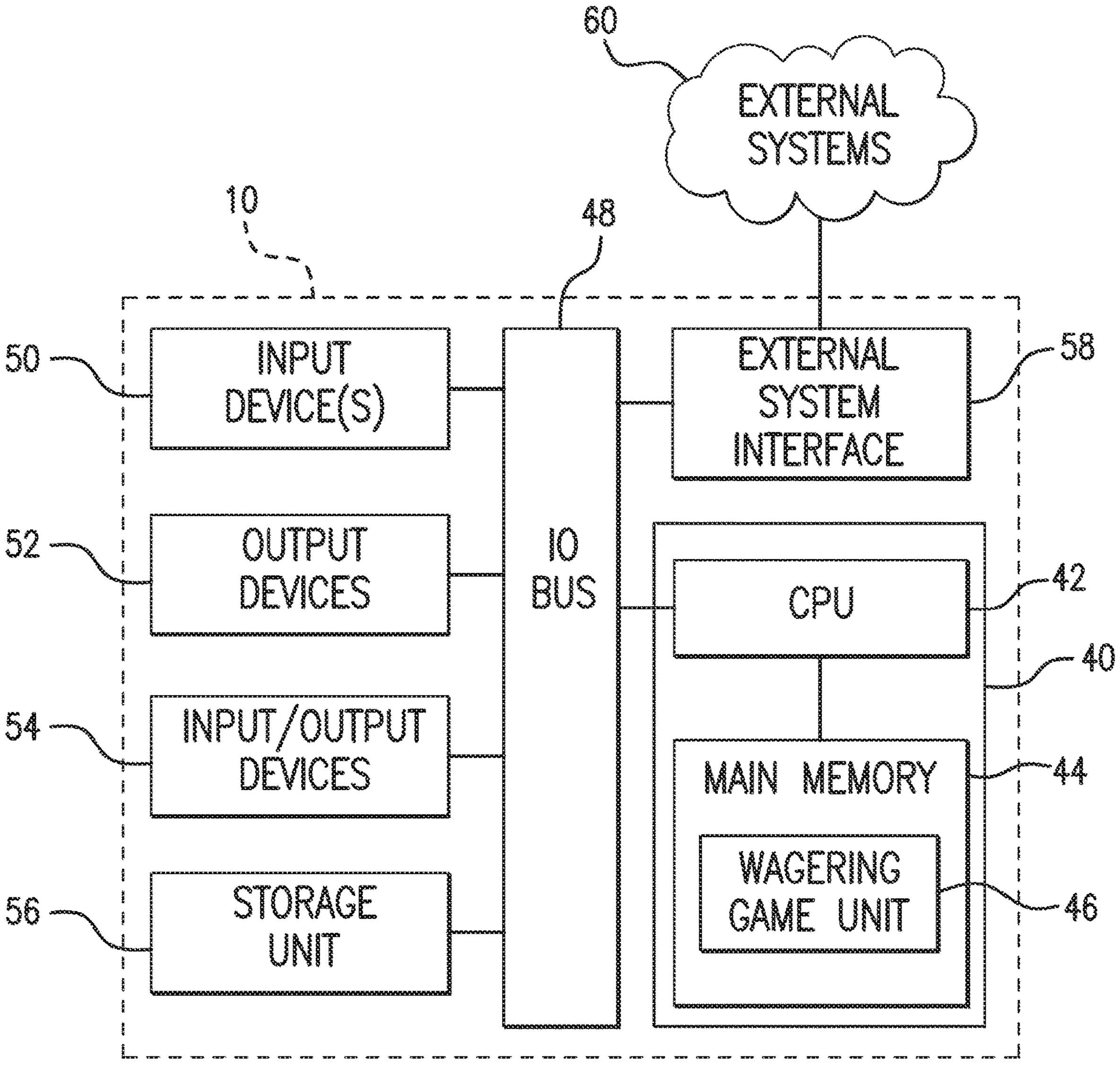
FIG. 2 is a schematic view of a gaming system according to an embodiment of the present invention.

Turning now to FIG. 2, there is shown a block diagram of the gaming-machine architecture. The gaining machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player’s portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within (“thick client”), external to (“thin client”), or distributed both within and external to (“intermediate client”) the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
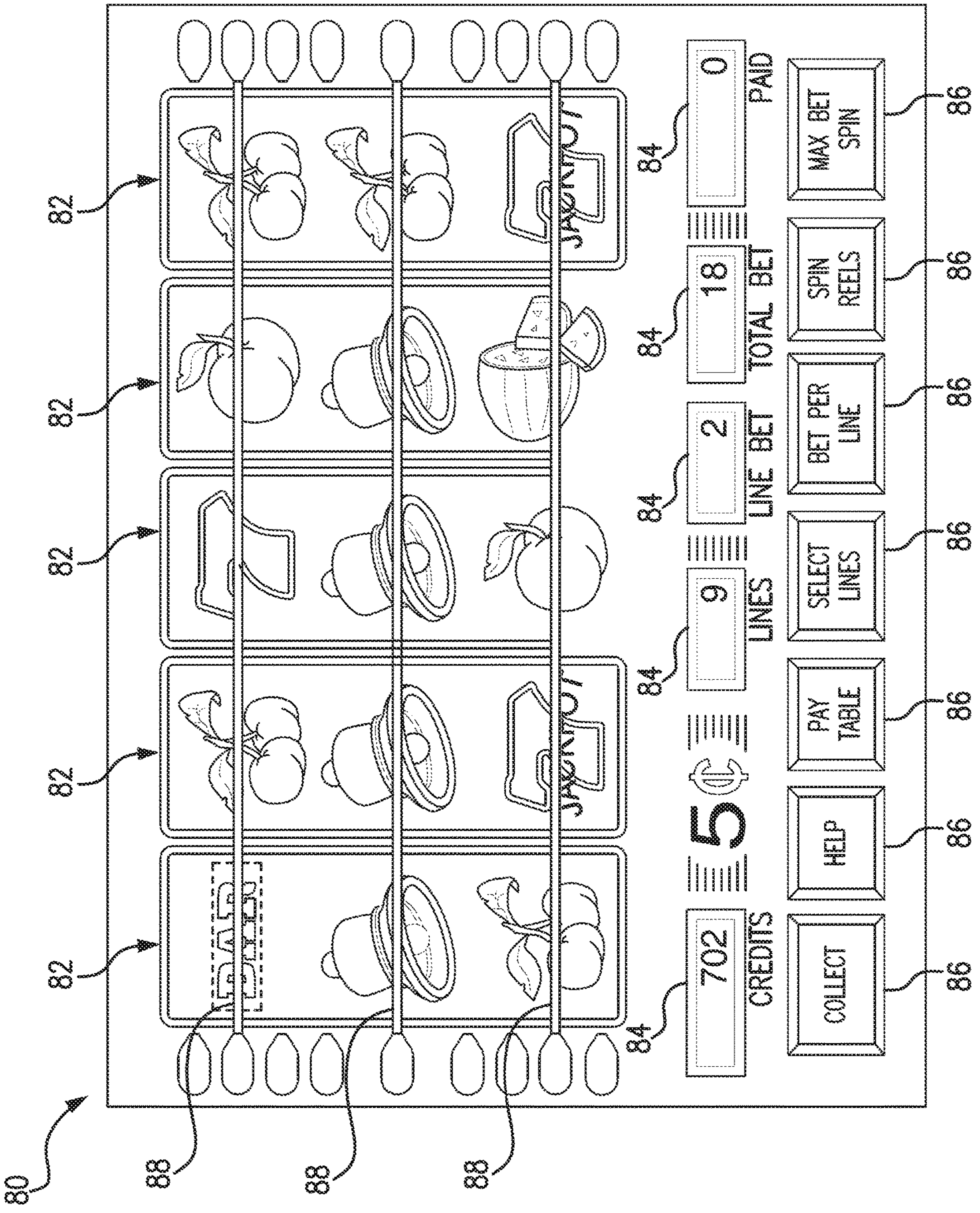
FIG. 3 is an image of an exemplary basic-game screen of a wagering game displayed on a gaming machine, according to embodiments of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager drawn on or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
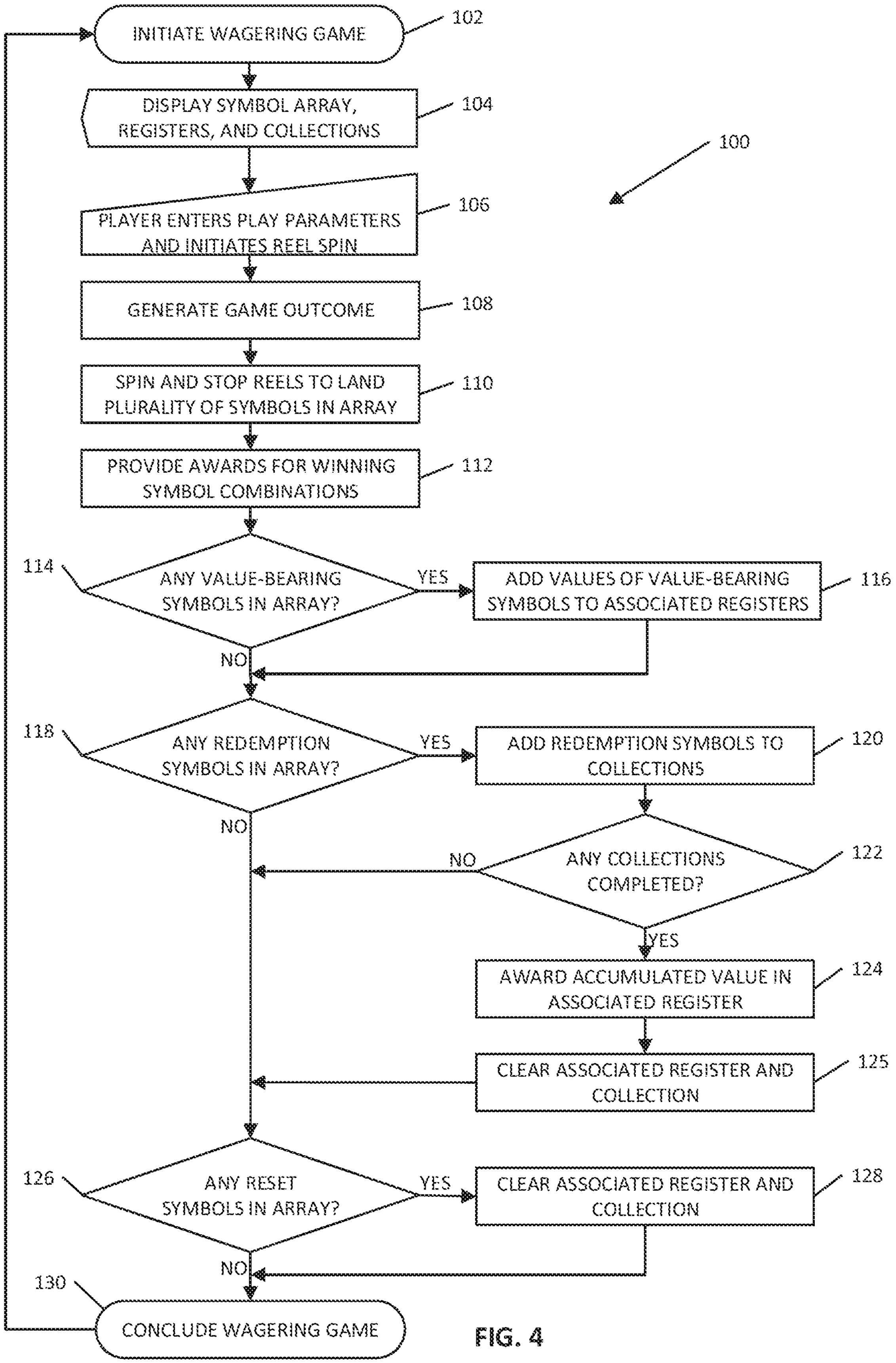
FIG. 4 is a flowchart for an algorithm that corresponds to instructions executed by a controller in accord with a first embodiment of the present invention.

Referring now to FIG. 4, there is shown a flowchart representing a data processing method 100 corresponding to at least some instructions stored and executed by the game-logic circuitry 40 in FIG. 2 to perform operations according to a first embodiment of the present invention.

At step 102, the game-logic circuitry initiates a wagering game. At step 104, the game-logic circuitry directs a display of the gaming machine to display an array of symbol positions, registers (or meters or banks), and collections (or collection meters). The array of symbol positions is arranged in a number of rows (e.g., three rows) by a number of columns (e.g., five columns). The array of symbol positions defines a plurality of subsets of symbol positions with each subset associated with a respective register and a respective collection. In one embodiment, the subsets are the columns of the array. In another embodiment, the subsets are the rows of the array. In yet another embodiment, the subsets are random or fixed zones of symbol positions. The zones may form various shapes such as an S-shape, Z-shape, T-shape, L-shape, Line-shape, Mirrored L-shape, and a square-shape, and the zones may contain the same or different numbers of symbol positions. At step 106, a player enters play parameters such as a wager amount to be drawn from a credit balance (deducted from a credit meter) and a number of lines or ways along which winning symbol combinations must appear. To initiate a spin of the reels, the player may press a "Spin Reels" or "Max Bet" key on a button panel or touch screen. At step 108, in response to the player initiating the reel spin, the game-logic circuitry generates a random game outcome. At step 110, the game-logic circuitry spins and stops the reels to land a plurality of symbols in the displayed array according to the selected game outcome. At step 112, the game-logic circuitry provides awards for any winning symbol combinations (e.g., line pays and scatter pays) in the array.

At step 114, the game-logic circuitry determines whether or not the landed plurality of symbols include any value-bearing symbols.

If the landed plurality of symbols include any value-bearing symbols at step 114, the game-logic circuitry adds values borne by the value-bearing symbols to their associated registers at step 116. For example, if each column of the array is associated with a respective register, the values borne by any value-bearing symbols in a column are added to that column's register. If, however, the landed plurality of symbols do not include any value-bearing symbols at step 114, flow proceeds to step 118.

At step 118, the game-logic circuitry determines whether or not the landed plurality of symbols include any redemption symbols (e.g., diamond symbols in the illustrated embodiment).

If the landed plurality of symbols include any redemption symbols at step 118, the game-logic circuitry adds the redemption symbols (or representations thereof) to their associated collections at step 120. For example, if each column of the array is associated with a respective collection, any redemption symbols in a column are added to that column's collection. At step 122, the game-logic circuitry then determines whether or not any collections are complete (i.e., a requisite number of redemption symbols are accumulated in a collection). If any collections are complete at step 122, the game-logic circuitry awards the accumulated value in the register associated with the column with the completed collection at 124, clears or resets that column's register and collection at step 125, and then proceeds to step 126. If, however, no collections are complete at step 122, flow proceeds to step 126.

If the landed plurality of symbols do not include any redemption symbols at step 118, flow proceeds to step 126.

At step 126, the game-logic circuitry determines whether or not the landed plurality of symbols include any reset symbols (e.g., bomb symbols in the illustrated embodiment). If the landed plurality of symbols include any reset symbols at step 126, the game-logic circuitry clears or resets their associated registers and collections at step 128, without awarding the accumulated value in those registers, and then concludes the current game cycle at step 130. For example, if each column of the array is associated with a respective register, any reset symbols in that column clear or reset that column's register and collection. If, however, the landed plurality of symbols do not include any reset symbols at step 126, the game-logic circuitry concludes the current game cycle at step 130.

Figure 5A:
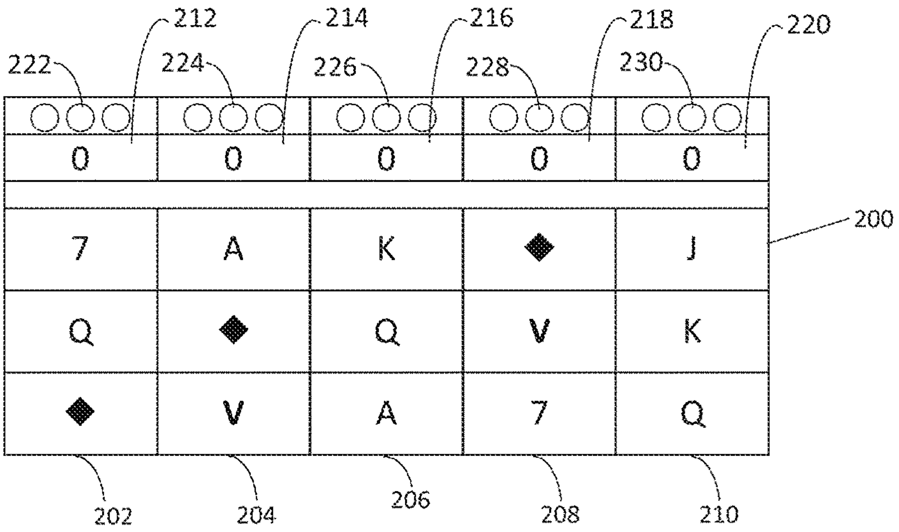
FIGS. 5A-5C through FIGS. 8A-8C are representations of a series of game cycles of a wagering game displayed on a gaming machine, according to the first embodiment.
Figure 5B:
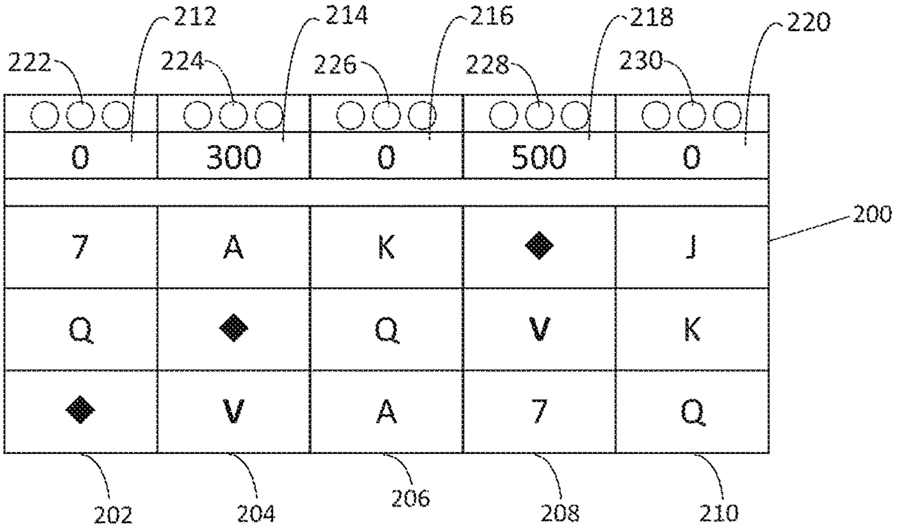
Figure 5C:
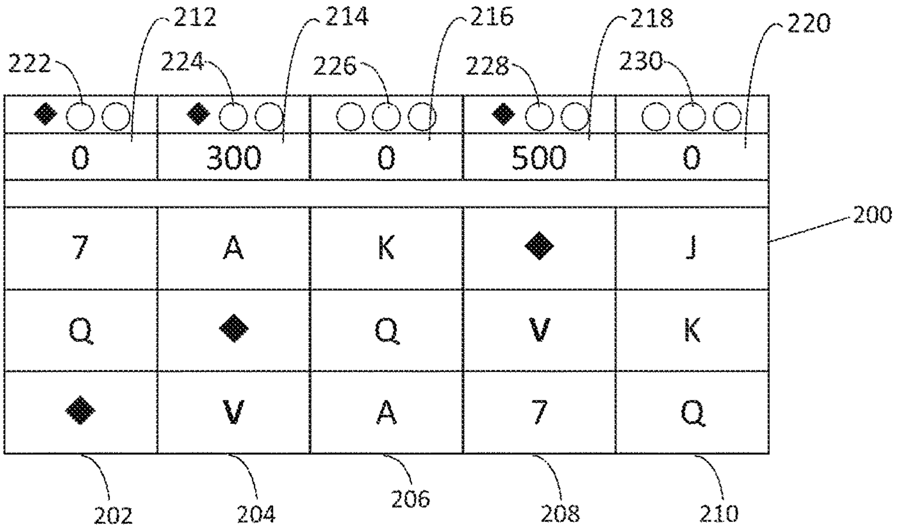
Figure 6A:
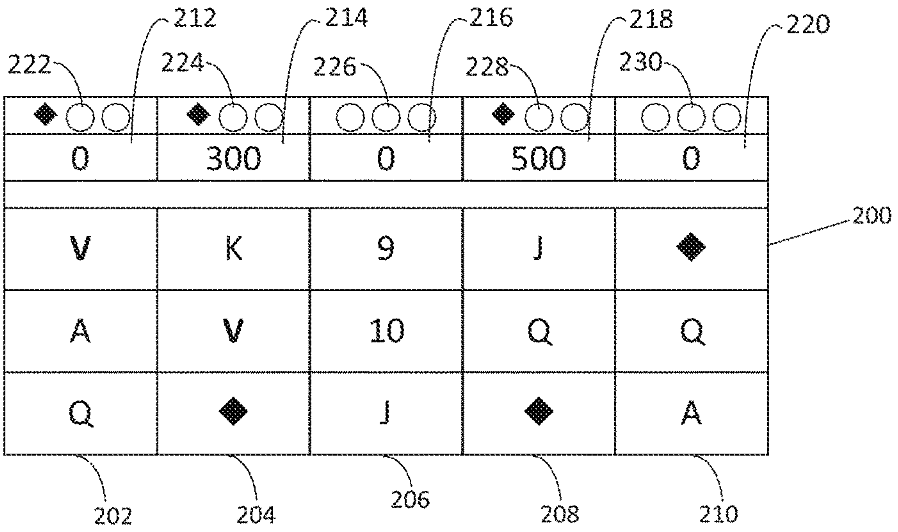
Figure 6B:
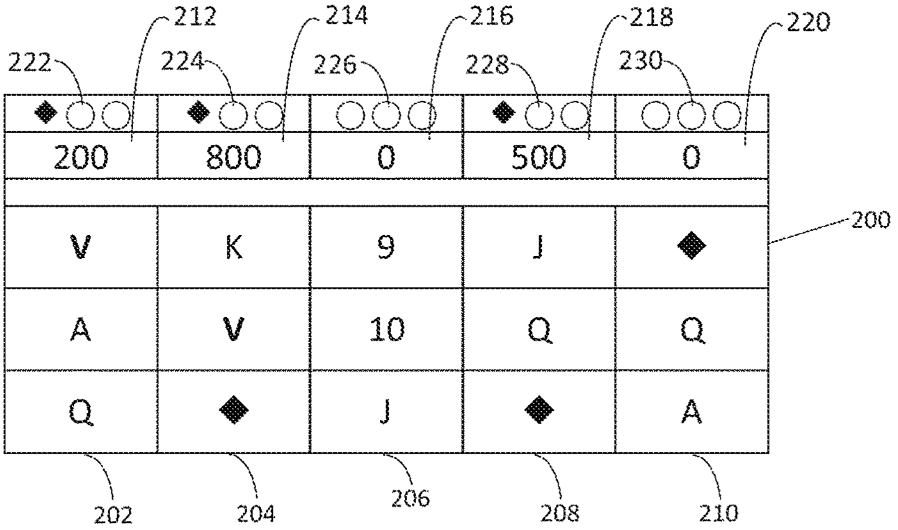
Figure 6C:
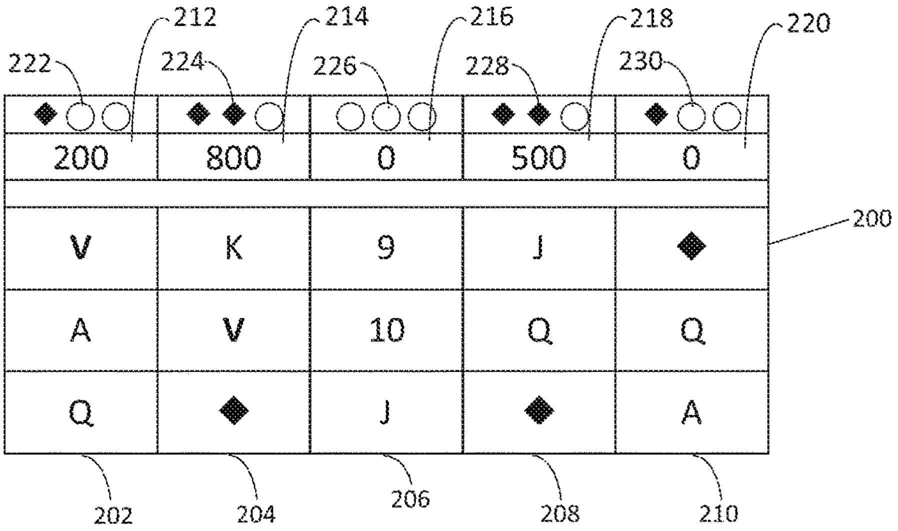
Figure 7A:
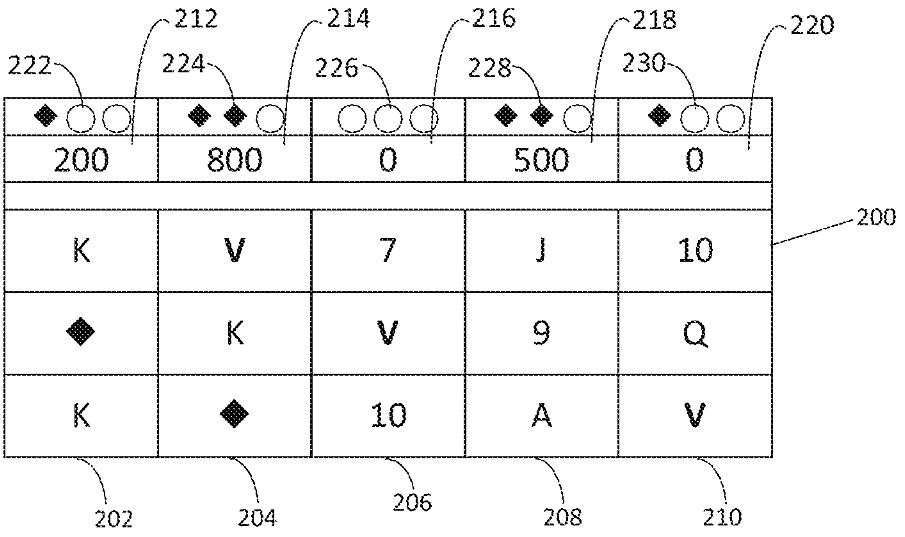
Figure 7B:
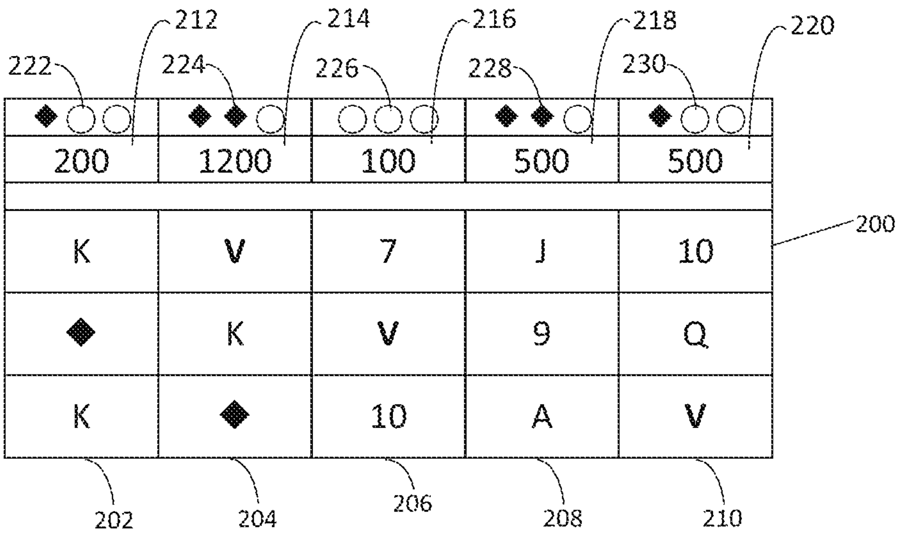
Figure 7C:
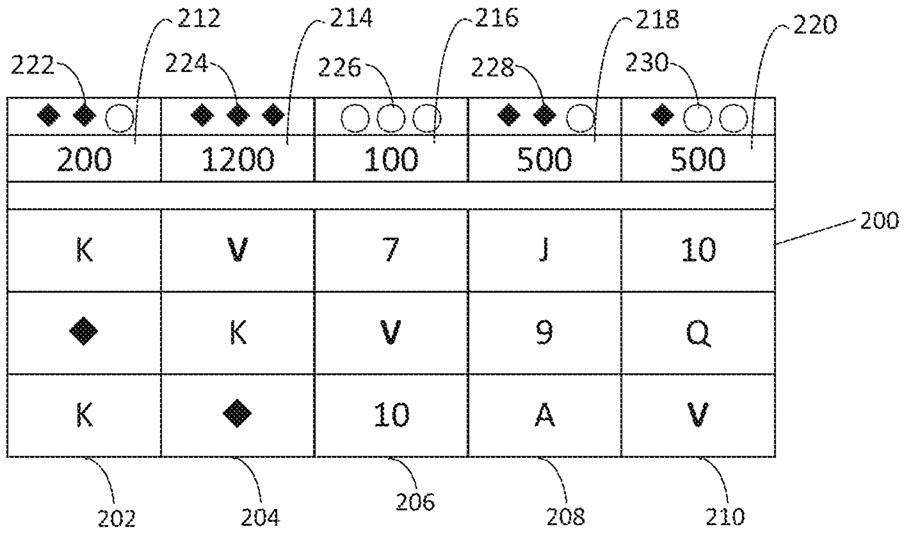
Figure 7D:
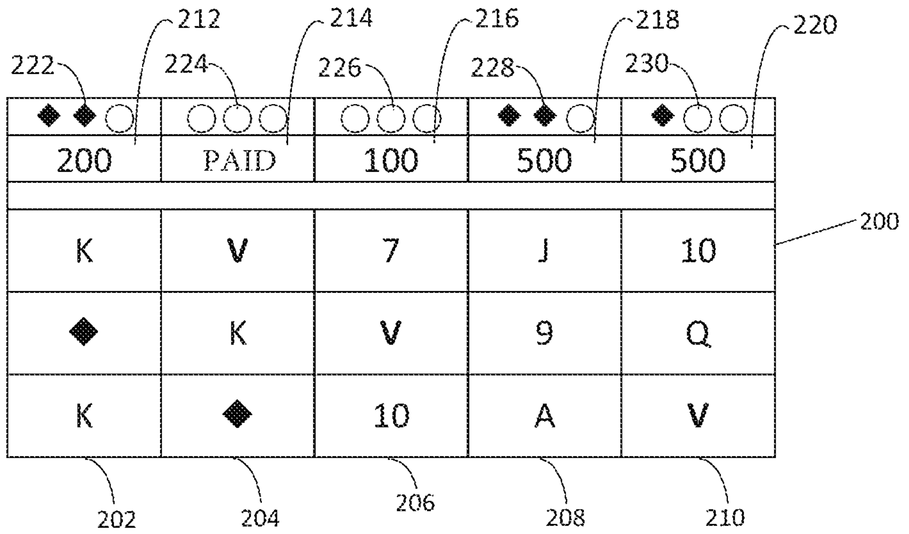
Figure 8A:
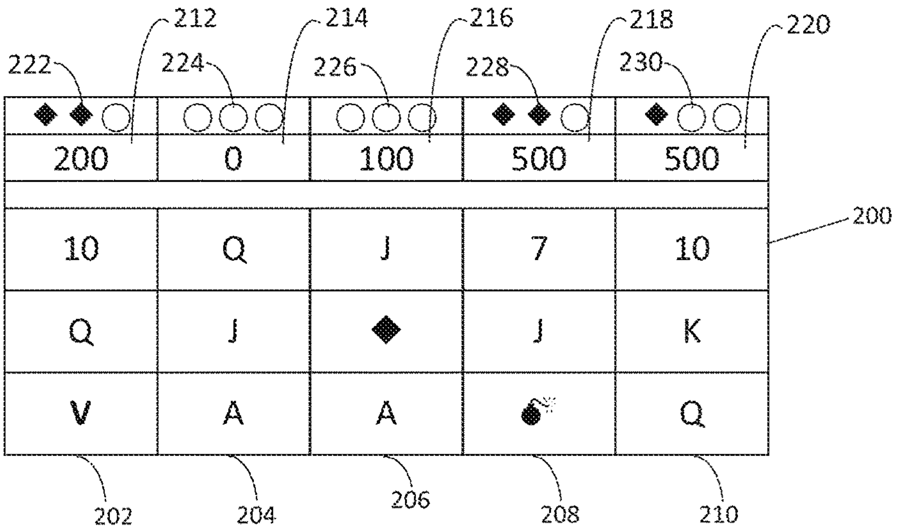
Figure 8B:
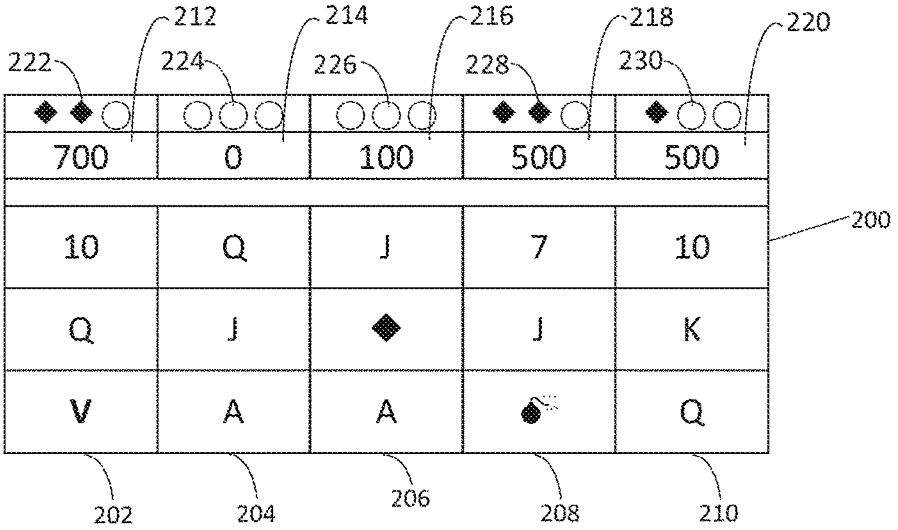
Figure 8C:
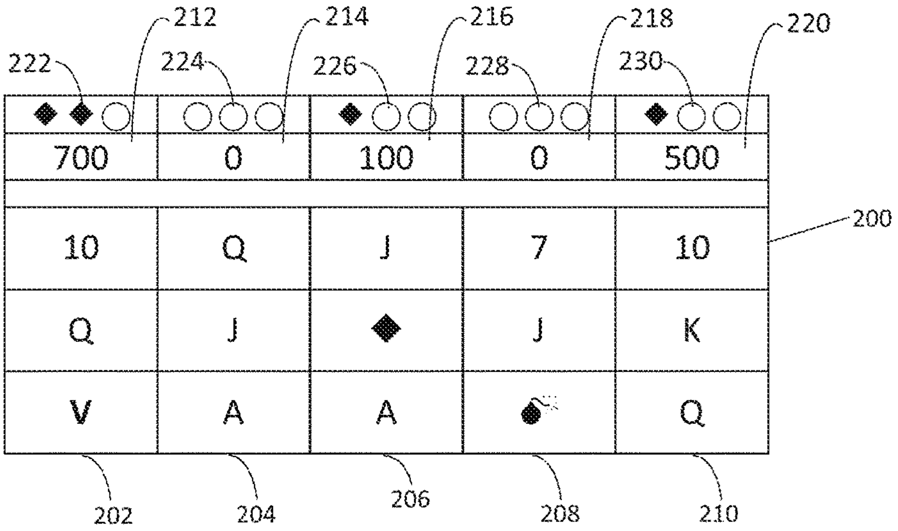

FIGS. 5A-5C through 8A-8C illustrate an example of base game play under control of the game-logic circuitry implementing the data processing method represented in FIG. 4. Each set of figures represents a respective base game cycle. Specifically, FIGS. 5A-5C represents a first game cycle; FIGS. 6A-6C represents a second game cycle succeeding the first cycle; FIGS. 7A-7D represents a third game cycle succeeding the second cycle; and FIGS. 8A-8C represents a fourth game cycle succeeding the third cycle. In each game cycle, a plurality of symbol-bearing reels are spun and stopped to land a plurality of symbols in a symbol array 200. The illustrated array 200 has fifteen symbol positions arranged in three rows and five columns 202, 204, 206, 208, and 210. Each column is associated with a respective reel such that each stopped reel presents three symbols. Alternatively, each symbol position may be associated with a respective independent reel such that each stopped reel presents a single symbol. The array may have more or less rows and/or columns. The number of symbol positions in each column may vary from each other. For example, the first, third, and fifth columns 202, 206, and 210 may have three symbol positions vertically aligned with each other, while the second and fourth columns 204 and 208 have four symbol positions that are vertically aligned with each other but vertically offset from the other columns by one-half symbol position. In the illustrated example, each symbol column defines a subset of symbol positions and is associated with a respective register and a respective collection positioned above the column: column 202 is associated with register 212 and collection 222; column 204 is associated with register 214 and collection 224; column 206 is associated with register 216 and collection 226; column 208 is associated with register 218 and collection 228; and column 210 is associated with register 220 and collection 230. As disclosed herein, instead of each column being associated with a respective register and collection, the array of symbol positions may be divided into other subsets of symbol positions with each subset associated with a respective register and collection. When the gaming machine is first powered on and/or when a player commences a new game play session at the machine, the registers are initially set to zero and the collections are initially empty.

Referring to the first game cycle of FIGS. 5A-5C, the reels are spun and stopped to land a plurality of symbols in the array 200. As shown in FIG. 5A, the landed plurality of symbols include two value-bearing symbols V and three redemption symbols in the form of diamonds ♦. Each value-bearing symbol V may be represented by a coin or chip bearing a respective credit value such as 100, 200, 300, 400, or 500 credits. Different value-bearing symbols V may bear the same or different credit values. As shown in FIG. 5B, values borne by the value-bearing symbols V in columns 204 and 208 are added to respective registers 214 and 218. As shown in FIG. SC, representations of the redemption symbols ♦ in columns 202, 204, and 208 are added to respective collections 222, 224, and 228. Because no collections are complete (i.e., contain the requisite number of three redemption symbols ♦) and no reset symbols appear in the array 200, the states of the registers and collections in FIG. 5C persist to the second game cycle in FIGS. 6A-6C.

Referring to the second game cycle of FIGS. 6A-6C, the reels are spun and stopped to land another plurality of symbols in the array 200. As shown in FIG. 6A, the landed plurality of symbols include two value-bearing symbols V and three redemption symbols ♦. As shown in FIG. 6B, values borne by the value-bearing symbols V in columns 202 and 204 are added to respective registers 212 and 214. As shown in FIG. 5C, representations of the redemption symbols ♦ in columns 204, 208, and 210 are added to respective collections 224, 228, and 230. Because no collections are complete and no reset symbols appear in the array 200, the states of the registers and collections in FIG. 6C persist to the third game cycle in FIGS. 7A-7D.

Referring to the third game cycle of FIGS. 7A-7D, the reels are spun and stopped to land another plurality of symbols in the array 200. As shown in FIG. 7A, the landed plurality of symbols include three value-bearing symbols V and two redemption symbols ♦. As shown in FIG. 7B, values borne by the value-bearing symbols V in columns 204, 206, and 210 are added to respective registers 214, 216, and 220. As shown in FIG. 7C, representations of the redemption symbols ♦ in columns 202 and 204 are added to respective collections 222 and 224. Referring to FIG. 7D, the collection 224 associated with column 204 is complete with three redemption symbols ♦. As a result, the accumulated value in that column's register 214 is awarded to the player (as denoted by the "PAID" message), and that column's register 214 and collection 224 are cleared. Because no other collections (besides collection 224) are complete and no reset symbols appear in the array 200, the states of the registers and collections in FIG. 7D persist to the fourth game cycle in FIGS. 8A-8C.

Referring to the fourth game cycle of FIGS. 8A-8C, the reels are spun and stopped to land another plurality of symbols in the array 200. As shown in FIG. 8A, the landed plurality of symbols include one value-bearing symbol V, one redemption symbol ♦, and one reset symbol in the form of a bomb. As shown in FIG. 8B, the value borne by the value-bearing symbol V in column 202 is added to respective register 212. As shown in FIG. 8C, a representation of the redemption symbol ♦ in column 206 is added to respective collection 226. Because no collections are complete, none of the registers are paid out to the player. However, because a reset symbol appears in column 208, that column's register 218 and collection 228 are cleared without any award to the player. The states of the registers and collections in FIG. 8C persist to the next game cycle (not shown).

In each game cycle, prior to or after managing the registers and collections and providing any awards therefrom, the player may be awarded for any winning symbol combinations (e.g., line pays and scatter pays) that may appear in the array 200 (e.g., in FIGS. 5A, 6A, 7A, and 8A). And each game cycle may trigger bonus features as described herein. Instead of or in addition to the redemption symbols ♦, the value-bearing symbols V may serve as redemption symbols that contribute to the collections 222, 224, 226, 228, and 230. The redemption symbols ♦ may act as a wild symbol that substitutes for other standard symbols 7, 9, 10, J, Q, K, and A) on the reels. Also, one or more of the reels may bear stacks of two, three, or more adjacent redemption symbols ♦ such that it is possible to complete a collection of three redemption symbols ♦ and thereby award the associated register in a single game cycle. Although the requisite number of redemption symbols ♦ to complete a collection in the illustrated example is three, the requisite number may be less (e.g., two) or more (e.g., four) and may vary between different columns of the symbol array. In certain embodiments, the reset symbols 💣 may also have additional functionality to form winning symbol combinations and/or interact with other symbols, including other reset symbols 💣.

In one embodiment, when at least a predetermined number (e.g., six or more) of value-bearing symbols V appear in the array 200 during any game cycle, each value-bearing symbol V awards the accumulated value in the register associated with the column containing that symbol V. If multiple value-bearing symbols V land in a column, then the register for that column is awarded for each of the value-bearing symbols V in that column.

Figure 9:
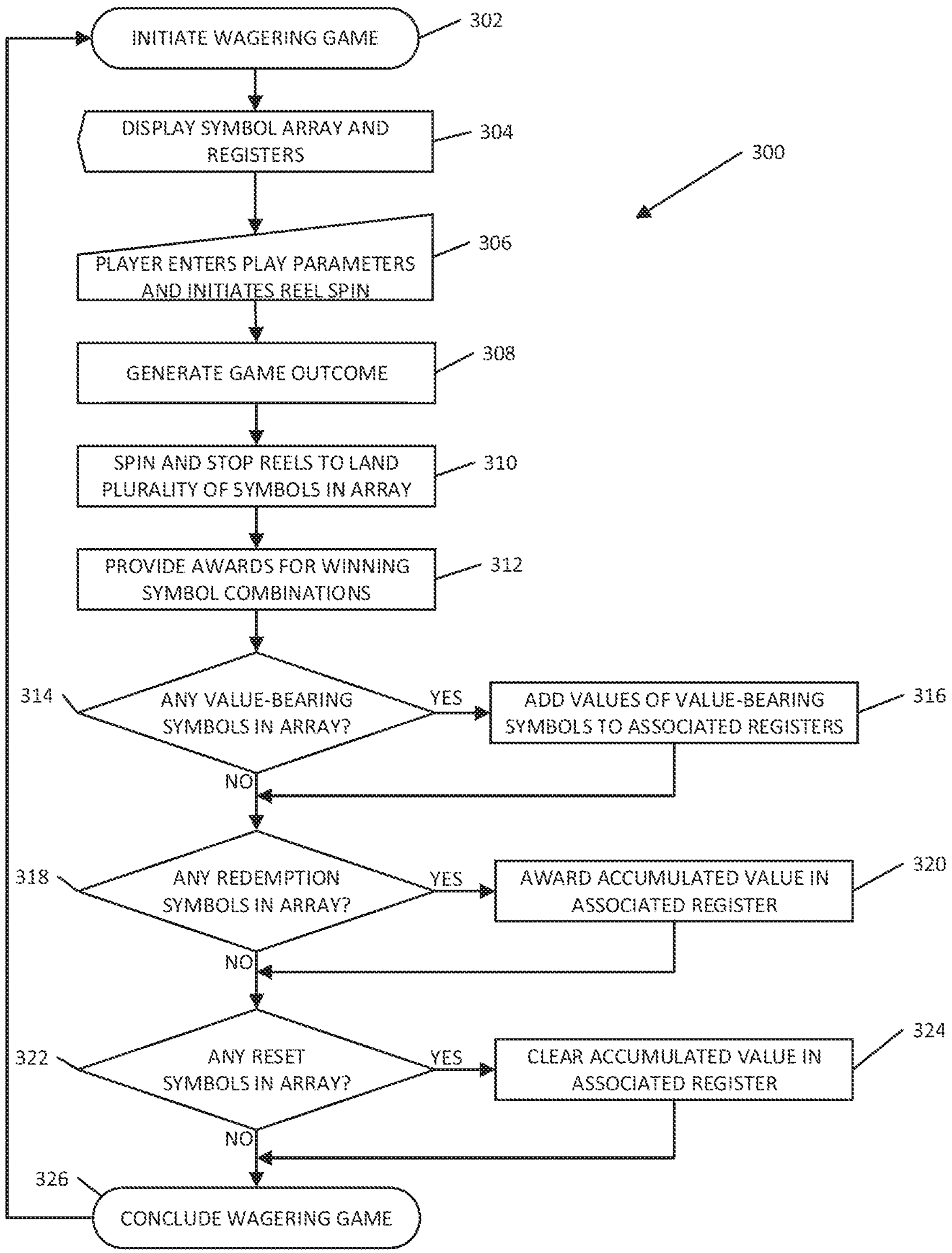
FIG. 9 is a flowchart for an algorithm that corresponds to instructions executed by a controller in accord with a second embodiment of the present invention.

Referring now to FIG. 9, there is shown a flowchart representing a data processing method 300 corresponding to at least some instructions stored and executed by the game-logic circuitry 40 in FIG. 2 to perform operations according to a second embodiment of the present invention. This embodiment is similar to the first embodiment except each symbol position is associated with a respective register and the accumulated value in a symbol position's register is awarded in response to collecting a single redemption symbol, instead of multiple redemption symbols, in that symbol position.

At step 302, the game-logic circuitry initiates a wagering game. At step 304, the game-logic circuitry directs a display of the gaming machine to display an array of symbol positions and registers (or meters or banks) in the respective symbol positions. The array of symbol positions is arranged in a number of rows (e.g., three rows) by a number of columns (e.g., five columns). Each symbol position contains a respective register. At step 306, a player enters play parameters such as a wager amount to be drawn from a credit balance (deducted from a credit meter) and number of lines or ways along which winning symbol combinations must appear. To initiate a spin of the reels, the player may press a "Spin Reels" or "Max Bet" key on a button panel or touch screen. At step 308, in response to the player initiating the reel spin, the game-logic circuitry generates a random game outcome. At step 310, the game-logic circuitry spins and stops the reels to land a plurality of symbols in the displayed array according to the selected game outcome. At step 312, the game-logic circuitry provides awards for any winning symbol combinations (e.g., line pays and scatter pays) in the array.

At step 314, the game-logic circuitry determines whether or not the landed plurality of symbols include any value-bearing symbols.

If the landed plurality of symbols include any value-bearing symbols at step 314, the game-logic circuitry adds values borne by the value-bearing symbols to their associated registers at step 316, i.e., the registers in the symbol positions where the value-bearing symbols land. If, however, the landed plurality of symbols do not include any value-bearing symbols at step 314, flow proceeds to step 318.

At step 318, the game-logic circuitry determines whether or not the landed plurality of symbols include any redemption symbols (e.g., diamond symbols in the illustrated embodiment). If the landed plurality of symbols include any redemption symbols at step 318, the game-logic circuitry awards the accumulated values in their associated registers at step 320, clears those registers, and then proceeds to step 322. In other words, the game-logic circuitry awards the accumulated values in the registers in the symbol positions where the redemption symbols land. If, however, the landed plurality of symbols do not include any redemption symbols at step 318, flow proceeds to step 322.

At step 322, the game-logic circuitry determines whether or not the landed plurality of symbols include any reset symbols (e.g., bomb symbols in the illustrated embodiment). If the landed plurality of symbols include any reset symbols at step 322, the game-logic circuitry clears or resets their associated registers at step 324 and then concludes the current game cycle at step 326. In other words, the game-logic circuitry clears the registers in the symbol positions where the reset symbols land, without awarding the accumulated value in those registers. If, however, the landed plurality of symbols do not include any reset symbols at step 322, the game-logic circuitry concludes the current game cycle at step 326.

Figure 10A:
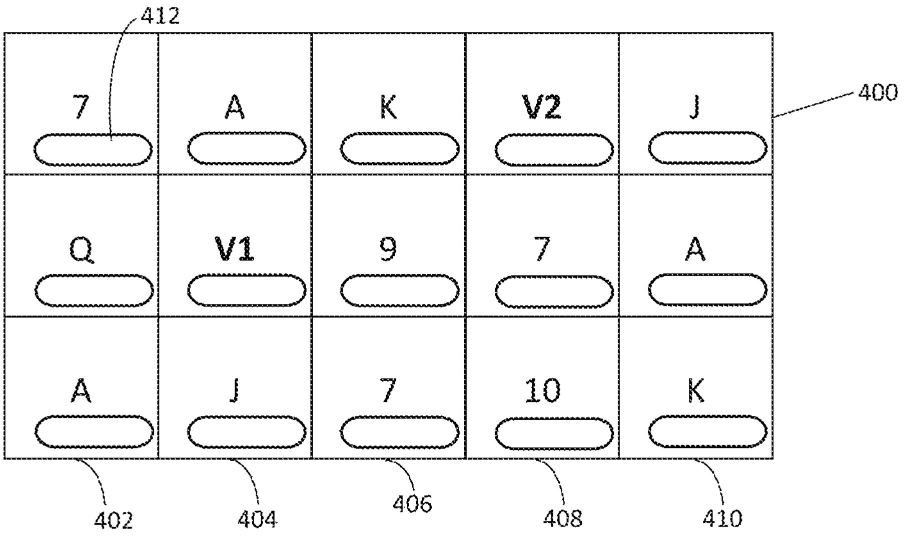
FIGS. 10A-10B through FIGS. 12A-12B are representations of a series of game cycles of a wagering game displayed on a gaming machine, according to the second embodiment.
Figure 10B:
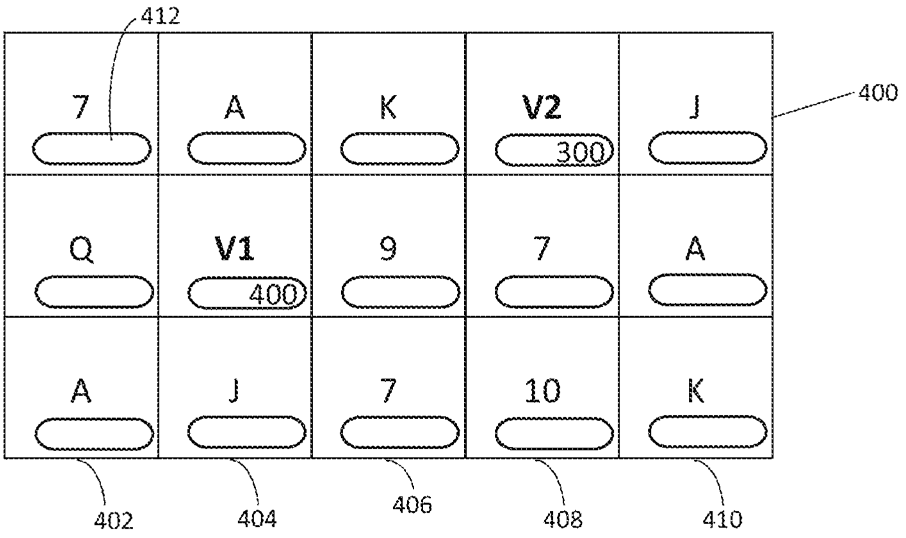
Figure 11A:
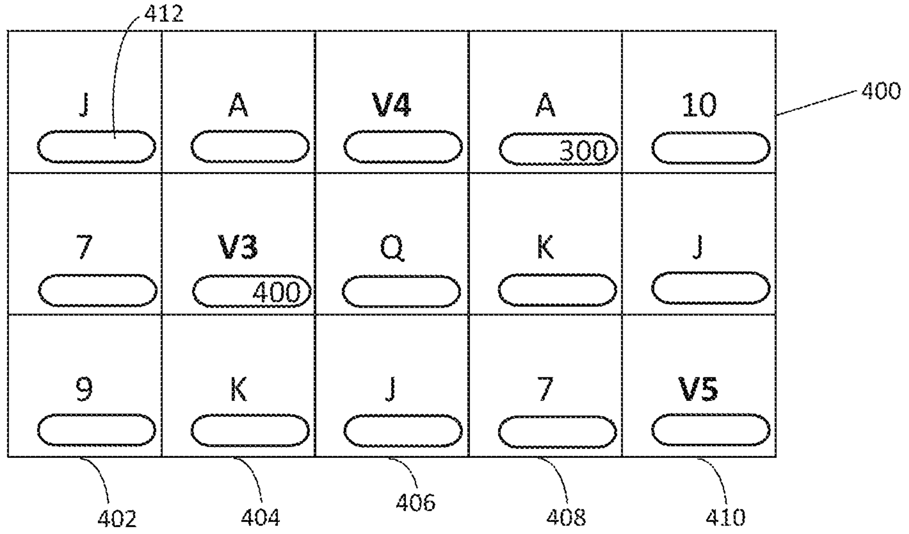
Figure 11B:
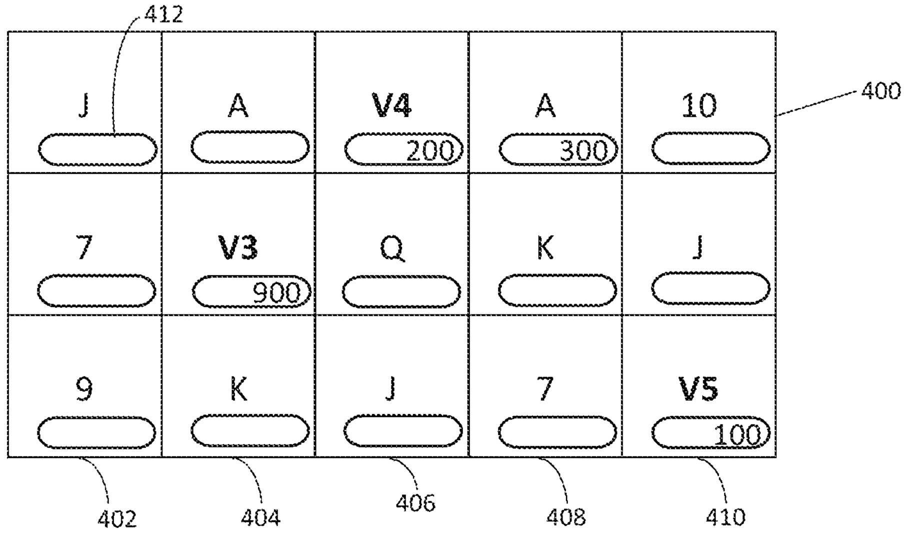
Figure 12A:
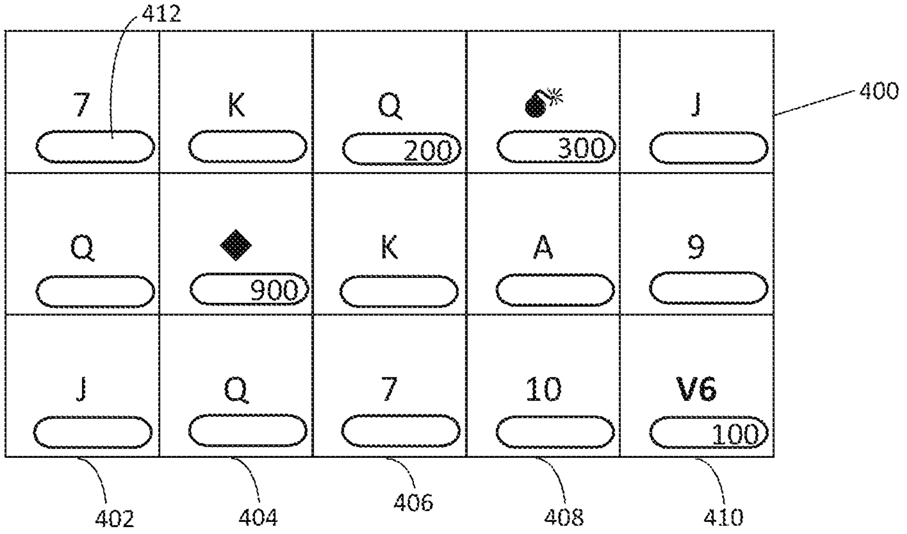
Figure 12B:
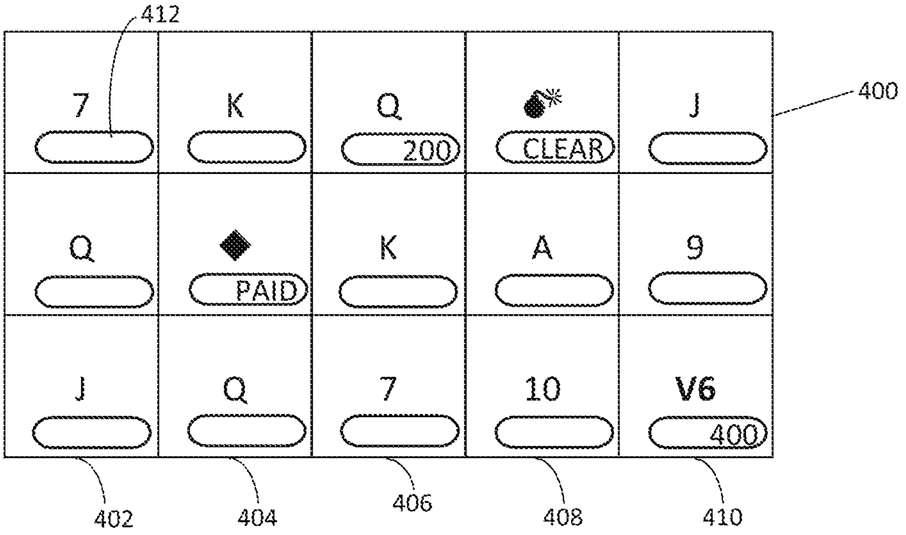

FIGS. 10A-10B through 12A-12B illustrate an example of base game play under control of the game-logic circuitry implementing the data processing method represented in FIG. 9. Each set of figures represents a respective base game cycle. Specifically, FIGS. 10A-10B represents a first game cycle; FIGS. 11A-11B represents a second game cycle succeeding the first cycle; and FIGS. 12A-12B represents a third game cycle succeeding the second cycle. In each game cycle, a plurality of symbol-bearing reels are spun and stopped to land a plurality of symbols in a symbol array 400. The illustrated array 400 has fifteen symbol positions arranged in three rows and five columns 402, 404, 406, 408, and 410. Each column is associated with a respective reel such that each stopped reel presents three symbols. Alternatively, each symbol position may be associated with a respective independent reel such that each stopped reel presents a single symbol. The array may have more or less rows and/or columns. The number of symbol positions in each column may vary from each other. For example, the first, third, and fifth columns 402, 406, and 410 may have three symbol positions vertically aligned with each other, while the second and fourth columns 404 and 408 have four symbol positions that are vertically aligned with each other but vertically offset from the other columns by one-half symbol position. Each symbol position is associated with a respective register 412 contained with the symbol position. When the gaming machine is first powered on and/or when a player commences a new game play session at the machine, the registers 412 are initially empty or set to zero.

Referring to the first game cycle of FIGS. 10A-10B, the reels are spun and stopped to land a plurality of symbols in the array 400. As shown in FIG. 10A, the landed plurality of symbols include two value-bearing symbols V1 and V2. Each value-bearing symbol may be represented by a coin or chip bearing a respective credit value such as 100, 200, 300, 400, or 500 credits. Different value-bearing symbols V may bear the same or different credit values. As shown in FIG. 10B, values borne by the value-bearing symbols V1 and V2 are added to respective registers 412 contained within the respective positions where the symbols V1 and V2 landed. The register values in FIG. 10B persist to the second game cycle in FIGS. 11A-11B.

Referring to the second game cycle of FIGS. 11A-11B, the reels are spun and stopped to land another plurality of symbols in the array 400. As shown in FIG. 11A, the landed plurality of symbols include three value-bearing symbols V3, V4, and V5. As shown in FIG. 11B, values borne by the value-bearing symbols V3, V4, and V5 are added to respective registers 412 contained within the respective positions where the symbols V3, V4, and V5 landed. Because the register 412 within the position where symbol V3 landed already had a value therein from the prior game cycle, the value of symbol V3 is added to that prior value. The register values in FIG. 11B persist to the third game cycle in FIGS. 12A-12B.

Referring to the third game cycle of FIGS. 12A-12B, the reels are spun and stopped to land another plurality of symbols in the array 400. As shown in FIG. 12A, the landed plurality of symbols include a value-bearing symbol V6, a redemption symbol in the form of a diamond symbol ♦, and a reset symbol in the form of a bomb symbol 💣. As shown in FIG. 12B, the value borne by the value-bearing symbol V6 is added to the register 412 contained within the position where the symbol V6 landed. The redemption symbol ♦ awards the 900 credits (see FIG. 12A) in its position's register 412 and then resets that register. The reset symbol 💣 clears the 300 credits (see FIG. 12A) from its position's register 412 without any award to the player. The register values in FIG. 12B persist to the next game cycle (not shown).

In each game cycle, prior to or after managing the registers and providing any awards therefrom, the player may be awarded for any winning symbol combinations (e.g., line pays and scatter pays) that may appear in the array 400 (e.g., in FIGS. 10A, 11A, and 12A). And each game cycle may trigger bonus features as described herein. The redemption symbols ♦ may act as a wild symbol that substitutes for other standard symbols (e.g., 7, 9, 10, J, Q, K, and A) on the reels. In certain embodiments, the reset symbol 💣 may act as a wild symbol and/or have other functionality associated with the standard symbols.

In one embodiment, each symbol position contains a respective collection similar to the collections 222, 224, 226, 228, and 230 of the first embodiment. To win the accumulated value in a symbol position's register, a requisite number (e.g., three) of redemption symbols ♦ must land in that symbol position over multiple game cycles before a reset symbol 💣 lands in that symbol position. A reset symbol 💣 clears that symbol position's register and the collection.

Figure 13:
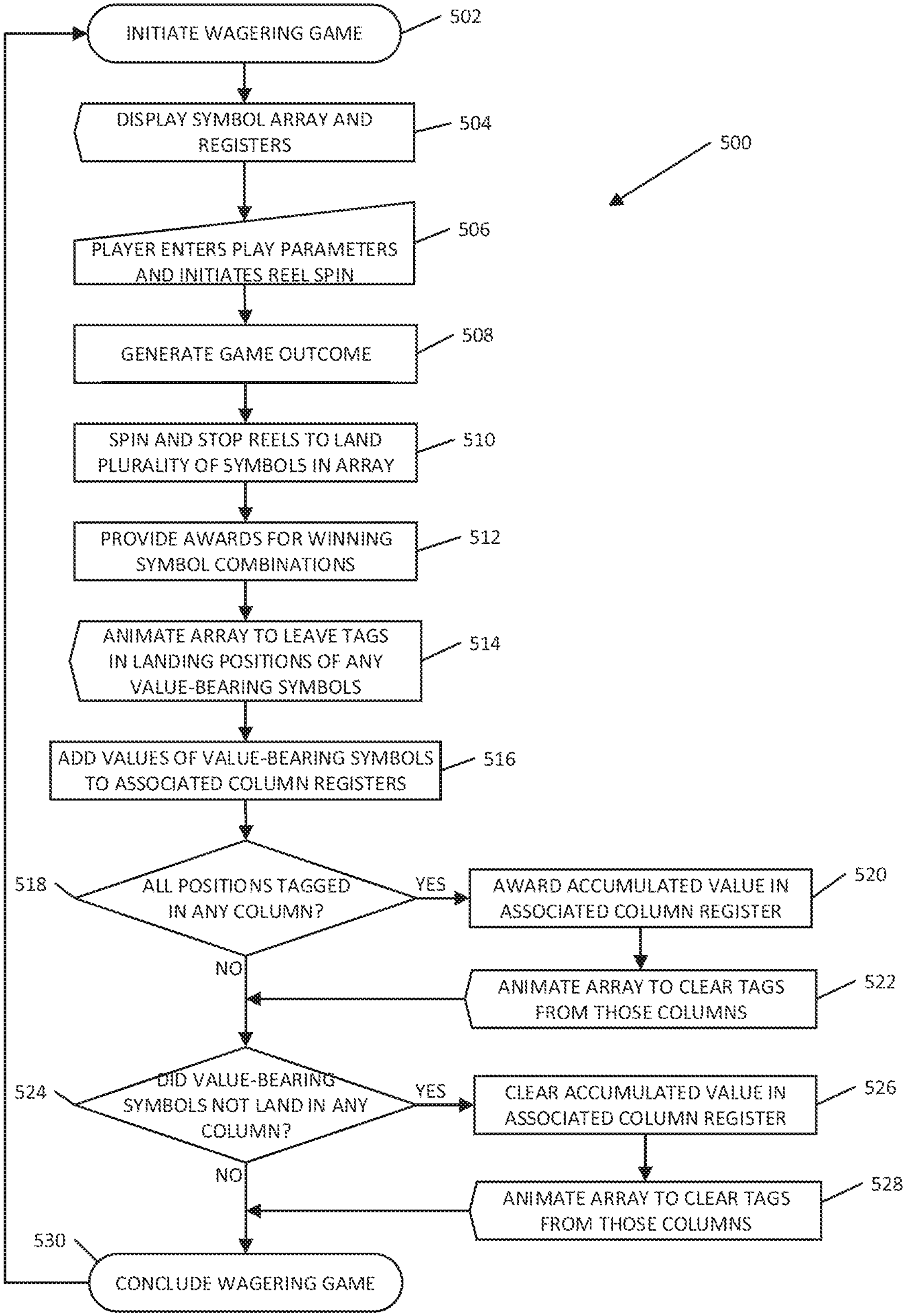
FIG. 13 is a flowchart for an algorithm that corresponds to instructions executed by a controller in accord with a third embodiment of the present invention.

Referring now to FIG. 13, there is shown a flowchart representing a data processing method 500 corresponding to at least some instructions stored and executed by the game-logic circuitry 40 in FIG. 2 to perform operations according to a third embodiment of the present invention.

At step 502, the game-logic circuitry initiates a wagering game. At step 504, the game-logic circuitry directs a display of the gaming machine to display an array of symbol positions and registers (or meters or banks). The array of symbol positions is arranged in a number of rows (e.g., three rows) by a number of columns (e.g., five columns). Each column may be associated with a respective register. Alternatively, each row may be associated with a respective register. At step 506, a player enters play parameters such as a wager amount to be drawn from a credit balance (deducted from a credit meter) and number of lines or ways along which winning symbol combinations must appear. To initiate a spin of the reels, the player may press a "Spin Reels" or "Max Bet" key on a button panel or touch screen. At step 508, in response to the player initiating the reel spin, the game-logic circuitry generates a random game outcome. At step 510, the game-logic circuitry spins and stops the reels to land a plurality of symbols in the displayed array according to the selected game outcome. At step 512, the game-logic circuitry provides awards for any winning symbol combinations (e.g., line pays and scatter pays) in the array.

At steps 514 and 516, for each value-bearing symbol among the plurality of symbols that land in the array, the game-logic circuitry animates the array to apply a visual tag to the landing position of the value-bearing symbol and adds the value borne by the value-bearing symbol to the register associated with the column including that landing position. The game-logic circuitry may, for example, tag a symbol position by applying a border, color change, background change, watermark, or other distinguishing characteristic to that position to distinguish it from untagged positions.

At step 518, the game-logic circuitry determines whether or not all positions in any column of the array are tagged, i.e., the array includes at least one column in which all positions in the column are tagged. If all positions in a column are tagged at step 518, the game-logic circuitry awards and resets the accumulated value in that column's register at step 520 and then animates the array to clear the tags from that column at step 522. If, however, all positions in any column are not tagged at step 518, the game-logic circuitry proceeds to step 524.

At step 524, the game-logic circuitry determines whether or not value-bearing symbols did not land in at least one column of the array, i.e., the array includes at least one column with no value-bearing symbols. If value-bearing symbols did not land in at least one column at step 524, the game-logic circuitry resets or clears the accumulated value in each such column's register at step 526, without awarding the value to the player, animates the array to clear the tags from that column at step 528, and concludes the current game cycle at step 530. If, however, each column includes at least one value-bearing symbol at step 524, the game-logic circuitry concludes the current game cycle at step 530.

Figure 14A:
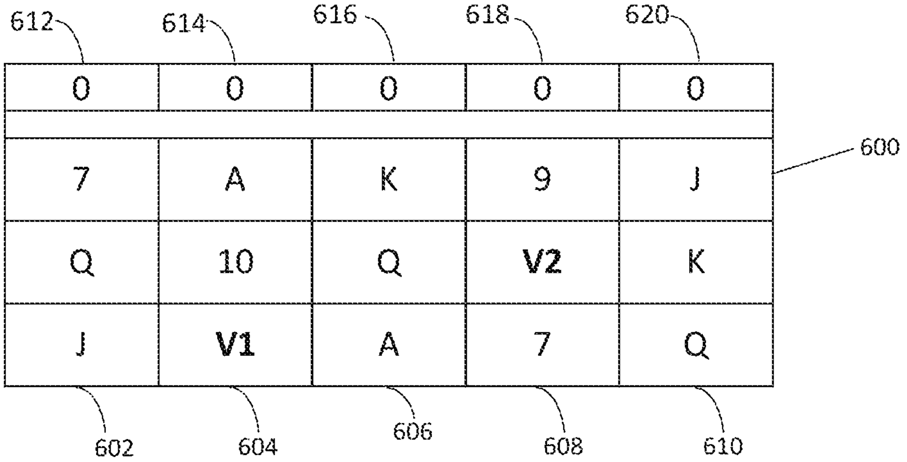
FIGS. 14A-14B through FIGS. 16A-16D are representations of a series of game cycles of a wagering game displayed on a gaming machine, according to the third embodiment.
Figure 14B:
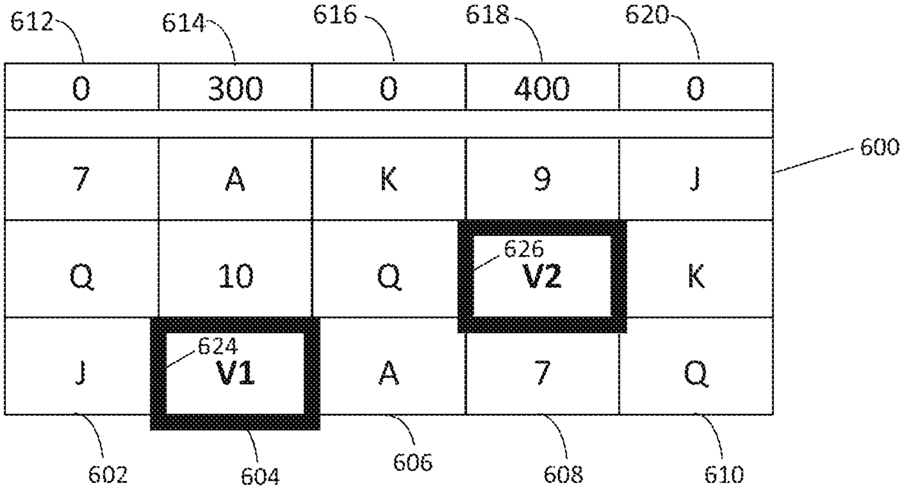
Figure 15A:
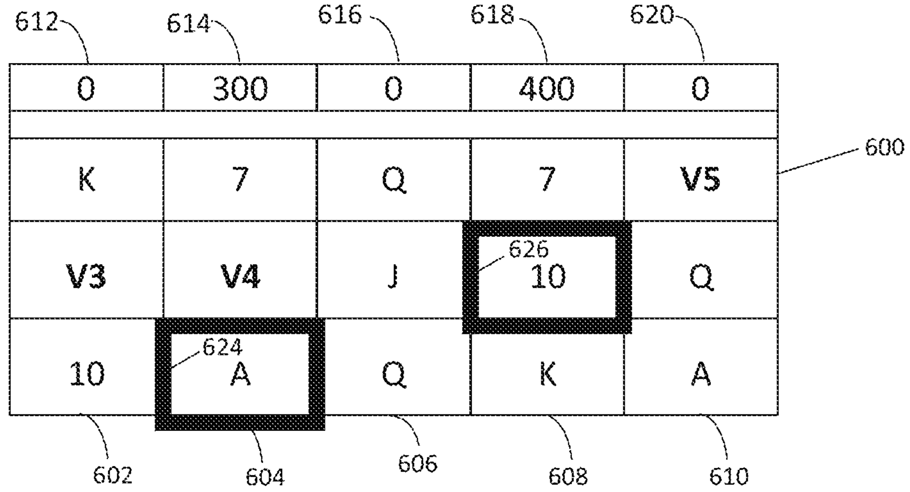
Figure 15B:
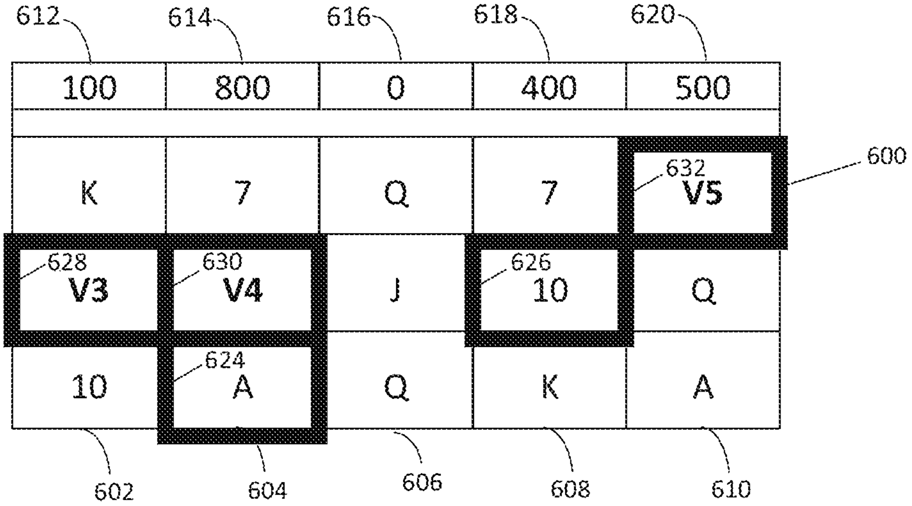
Figure 15C:
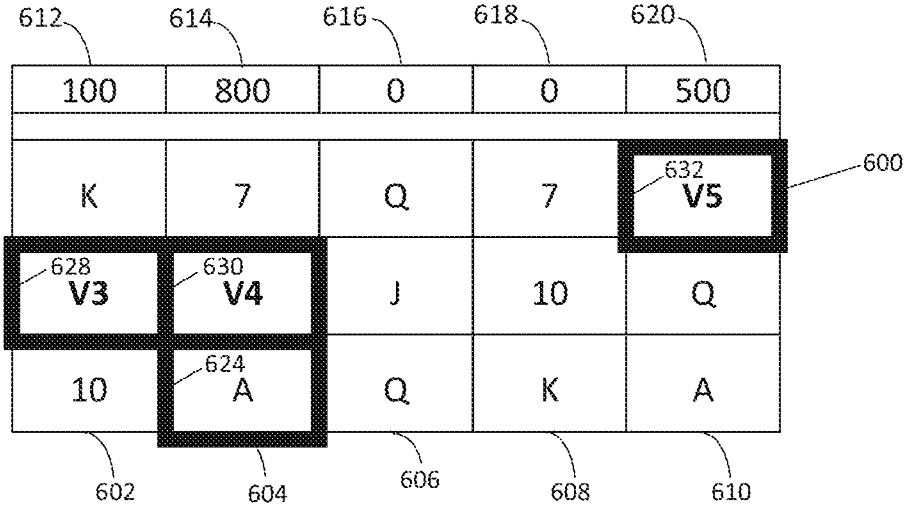

FIGS. 14A-14B through 16A-16D illustrate an example of base game play under control of the game-logic circuitry implementing the data processing method represented in FIG. 13. Each set of figures represents a respective base game cycle. Specifically, FIGS. 14A-14B represents a first game cycle; FIGS. 15A-15C represents a second game cycle succeeding the first cycle; and FIGS. 16A-16D represents a third game cycle succeeding the second cycle. In each game cycle, a plurality of symbol-bearing reels are spun and stopped to land a plurality of symbols in a symbol array 600. The illustrated array 600 has fifteen symbol positions arranged in three rows and five columns 602, 604, 606, 608, and 610. Each column is associated with a respective reel such that each stopped reel presents three symbols. Alternatively, each symbol position may be associated with a respective independent reel such that each stopped reel presents a single symbol. The array may have more or less rows and/or columns. The number of symbol positions in each column may vary from each other. For example, the first, third, and fifth columns 602, 606, and 610 may have three symbol positions vertically aligned with each other, while the second and fourth columns 604 and 608 have four symbol positions that are vertically aligned with each other but vertically offset from the other columns by one-half symbol position. Each symbol column is associated with a respective register positioned above the column: column 602 is associated with register 612; column 604 is associated with register 614; column 606 is associated with register 616; column 608 is associated with register 618; and column 610 is associated with register 620. When the gaming machine is first powered on and/or when a player commences a new game play session at the machine, the registers are initially empty or set to zero.

Referring to the first game cycle of FIGS. 14A-14B, the reels are spun and stopped to land a plurality of symbols in the array 600. As shown in FIG. 14A, the landed plurality of symbols include two value-bearing symbols V1 and V2. Each value-bearing symbol may be represented by a coin or chip bearing a respective credit value such as 100, 200, 300, 400, or 500 credits. Different value-bearing symbols, e.g., V1 and V2, may bear the same or different credit values. As shown in FIG. 14B, the array 600 is animated to apply visual tags 624 and 626 (in the form of thicker borders) to the symbol positions in which the symbols V1 and V2 landed. The values borne by the symbols V1 and V2 are added to the respective column registers 614 and 618. Because none of the columns have all three positions tagged, none of the register values are awarded to the player. Because no value-bearing symbols appear in columns 602, 606, and 610, associated registers 612, 616, and 620 and any tags in those columns are cleared without being awarded to the player. The applied tags 624 and 626 and register values in FIG. 14B persist to the second game cycle in FIGS. 15A-15C.

Referring to the second game cycle of FIGS. 15A-15C, the reels are spun and stopped to land another plurality of symbols in the array 600. As shown in FIG. 15A, the landed plurality of symbols include three value-bearing symbols V3, V4, and V5. As shown in FIG. 15B, the array 600 is animated to apply visual tags 628, 630, and 632 to the symbol positions in which the symbols V3, V4, and V5 landed. The values borne by the symbols V3, V4, and V5 are added to the respective column registers 612, 614, and 620. Because none of the columns have all three positions tagged, none of the register values are awarded to the player. As shown in FIG. 15C, because no value-bearing symbols appear in columns 606 and 608, associated registers 616 and 618 and ally tags (i.e., tag 626 in FIG. 15B) in those columns are cleared without being awarded to the player. The remaining tags 624, 628, 630, and 632 and register values in FIG. 15C persist to the third game cycle in FIGS. 16A-16D.

Figure 16A:
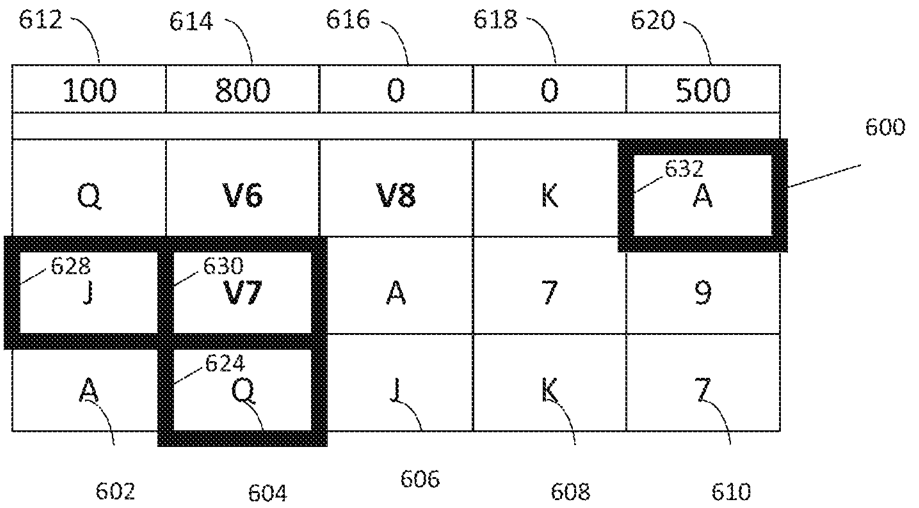
Figure 16B:
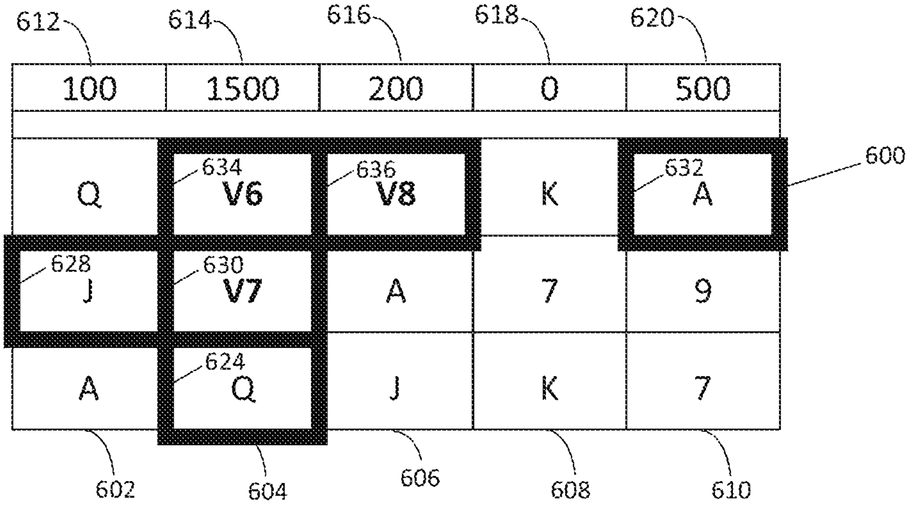
Figure 16C:
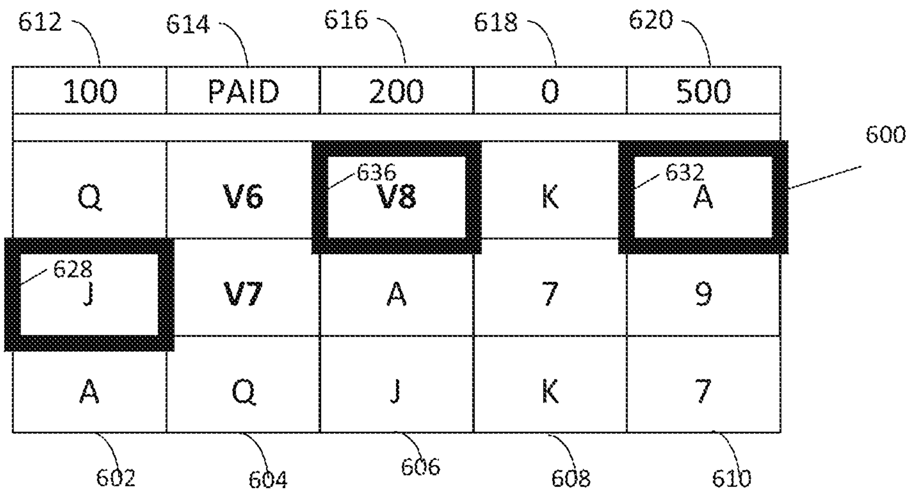
Figure 16D:
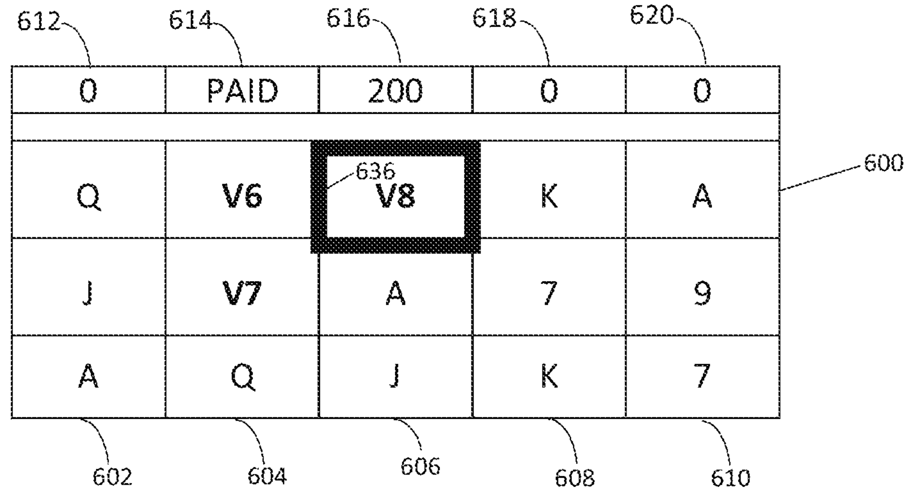

Referring to the third game cycle of FIGS. 16A-16D, the reels are spun and stopped to land another plurality of symbols in the array 600. As shown in FIG. 16A, the landed plurality of symbols include three value-bearing symbols V6, V7, and V8. As shown in FIG. 16B, the array 600 is animated to apply (or keep) visual tags 634, 630, and 636 to the symbol positions in which the symbols V6, V7, and V8 landed. The values borne by the symbols V6 and V7 are added to the respective column register 614, and the value borne by the symbol V8 is added to the respective column register 616. All three positions in column 604 are tagged. Therefore, as shown in FIG. 16C, its accumulated register value of 1500 credits is awarded to the player, and the array is animated to clear the tags 624, 630, and 634 from that column. As shown in FIG. 16D, because no value-bearing symbols appear in columns 602, 608, and 610, associated registers 612, 618, and 620 and any tags (i.e., tags 628 and 632) in those columns are cleared without being awarded to the player. The applied tag 636 and register values in FIG. 16D persist to the next game cycle (not shown).

In each game cycle, prior to or after providing any awards for landed value-bearing symbols, the player may be awarded for any winning symbol combinations (e.g., line pays and scatter pays) that may appear in the array 600 (e.g., in FIGS. 14A, 15A, and 16A). And each game cycle may trigger bonus features as described herein. In one embodiment, the tags "time out" and clear after a predetermined number of game cycles or other triggering event (e.g., cash out, bonus game trigger, etc.), even if the tags are not cleared by other means disclosed herein. The tags may carry over from the basic game into a free game bonus triggered during play of the basic game. The free game bonus may operate like the basic game (but without requiring a wager in each game cycle), and any tags remaining at the conclusion of the free game bonus may carry back from the free game bonus into the basic game. In addition to being left behind by value-bearing symbols, tags may be randomly added to untagged symbol positions in the array.

In the various embodiments, when the registers are cleared or reset, they may be reset to a non-zero value. The reset values for the different registers may vary. For example, the reset values may ascend from the leftmost column to the rightmost column such that the reset value for the register(s) associated with the leftmost column is lower than the reset value for the register(s) associated with the rightmost column.

Figure 17:
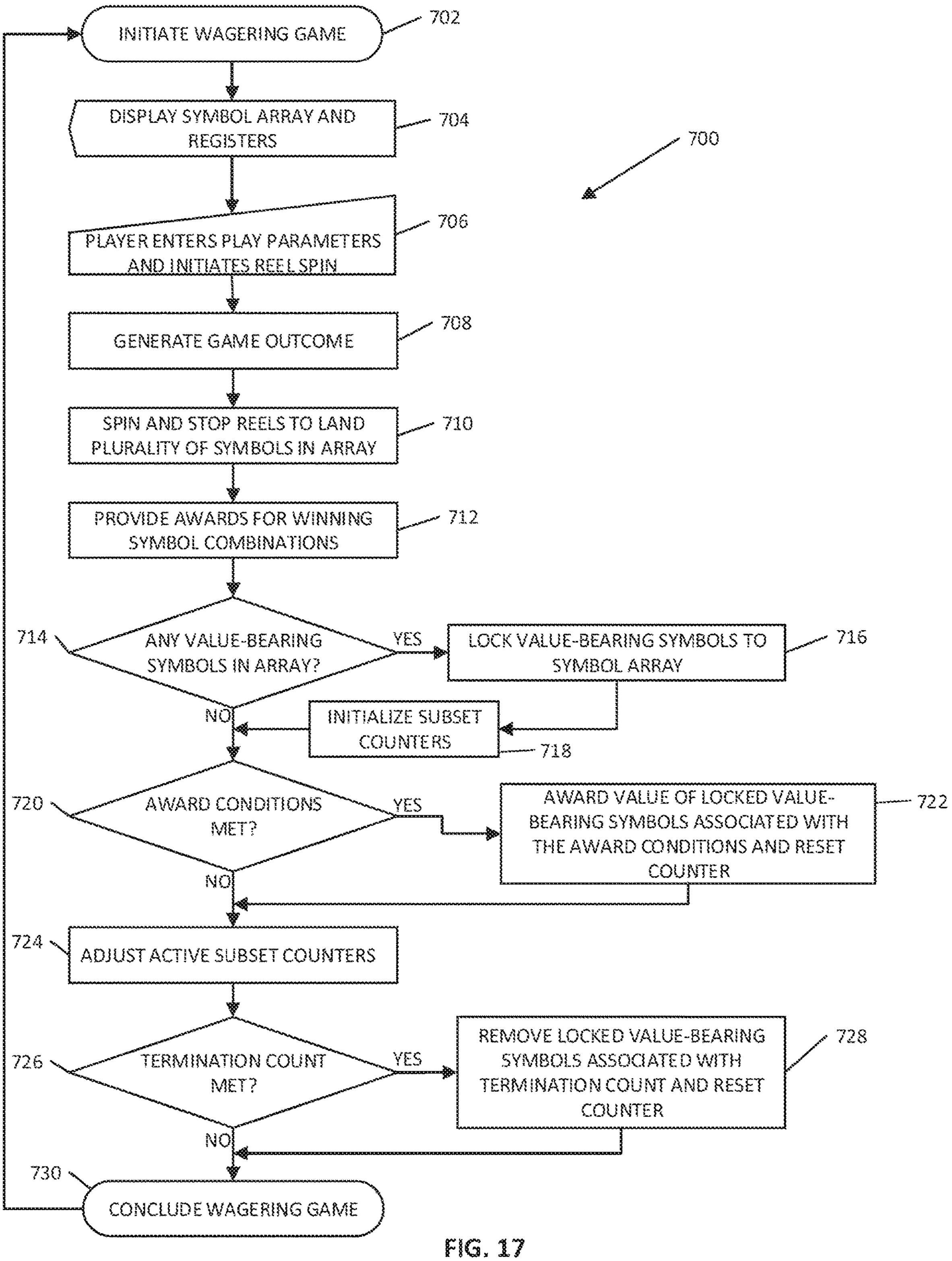
FIG. 17 is a flowchart for an algorithm that corresponds to instructions executed by a controller in accord with a fourth embodiment of the present invention.

Referring now to FIG. 17, there is shown a flowchart representing a data processing method 700 corresponding to at least some instructions stored and executed by the game-logic circuitry 40 in FIG. 2 to perform operations according to a fourth embodiment of the present invention. This embodiment is similar to the previous embodiments except values of value-bearing symbols are not stored in a register, but rather are held or locked into the symbol array until either one or more award conditions are met or a counter associated with the value-bearing symbols has met a termination count or value. For example, the award condition may be to fill a column with value-bearing symbols, and if this condition is met, the values indicated by the value-bearing symbols within the column are awarded. However, if a counter (e.g., a spin or game cycle counter) associated with the column reaches a termination count prior to the award condition, then the value-bearing symbols are removed from the column.

At step 702, the game-logic circuitry initiates a wagering game. At step 704, the game-logic circuitry directs a display of the gaming machine to display an array of symbol in the respective symbol positions. The array of symbol positions is arranged in a number of rows (e.g., three rows) by a number of columns (e.g., five columns). The symbol positions of the array may be allocated to one or more subsets for a value-bearing symbol feature described herein. In the example embodiment, each column defines a subset. In other embodiments, the subset may any other suitable grouping of symbol positions. Each subset is associated with a subset counter that is selectively initialized and terminated as described herein. At step 706, a player enters play parameters such as a wager amount to be drawn from a credit balance (deducted from a credit meter) and number of lines or ways along which winning symbol combinations must appear. To initiate a spin of the reels, the player may press a "Spin Reels" or "Max Bet" key on a button panel or touch screen. At step 708, in response to the player initiating the reel spin, the game-logic circuitry generates a random game outcome. At step 710, the game-logic circuitry spins and stops the reels to land a plurality of symbols in the displayed array according to the selected game outcome. At step 712, the game-logic circuitry provides awards for any winning symbol combinations (e.g., line pays and scatter pays) in the array.

At step 714, the game-logic circuitry determines whether or not the landed plurality of symbols include any value-bearing symbols. If one or more value-bearing symbols are included within the landed plurality of symbols, the game-logic circuitry then locks any value-bearing symbols to the symbol array at step 716 such that the locked value-bearing symbols remain within the symbol array through one or more subsequent spins. Each value-bearing symbol may be locked to a symbol position, row, or column, such as the symbol position, row, or column in which the value-bearing symbol occupied as part of the landed plurality of symbols.

At step 718, for subsets of the symbol array that did not include locked value-bearing symbols prior to the game outcome and are now occupied by one or more locked value-bearing symbols from step 716, a respective subset counter is initialized. The respective subset counter is initialized to an initial count or value. In at least some embodiments, the initial count is predetermined. In other embodiments, the initial count may be variable according to one or more parameters (e.g., randomly generated values, wager amount, player history, etc.). In the example embodiment, the subset counters are configured to count spins or game outcomes. In other embodiments, the subset counters may be configured to count a different parameter of the game, such as a number of outcomes with or without a particular symbol.

At step 720, the game-logic circuitry determines whether or not award conditions have been met for at least some of the locked value-bearing symbols. In the example embodiment, the award conditions include locking value-bearing symbols in every symbol position of a particular subset. In other embodiments, the award conditions may not require the entire subset be filled with value-bearing symbols, but rather a trigger amount of value-bearing symbols be reached. Additionally or alternatively, other suitable conditions within the symbol array may be incorporated within the award conditions.

At step 722, if the award conditions have been met (i.e., the number of value-bearing symbols has reached the trigger amount), the values visually indicated on the locked value-bearing symbols associated with the award conditions are awarded and the associated value-bearing symbols are removed or unlocked from the symbol array. That is, the value-bearing symbols may be removed immediately to reveal an underlying symbol or a blank space in its place on the symbol array until another spin or game cycle of the game is conducted. Unlocking the value-bearing symbols may cause the value-bearing symbols to 'spin' with other symbols in the symbol array, thereby freeing the underlying symbol position for a new symbol (including a subsequent value-bearing symbol) to land within. In some embodiments, achieving the award conditions for one subset may result in every value-bearing symbol within the array being removed or unlocked. It is to be understood that the award conditions of each subset may be at least partially independent from each other such that the award conditions for multiple subset may be met during the same game outcome. In such an outcome, awards for each winning subset may be provided simultaneously.

At step 724, the game-logic circuitry adjusts any initialized subset counters (referred to herein as "active counters" or "active subset counters") based on the game outcome. More specifically, the game-logic circuitry adjusts the active counters for at least three different states of the associated subset: (i) an award condition has been met; (ii) additional value-bearing symbols have been locked into the subset; and (iii) no new value-bearing symbols have been locked into the subset. A fourth state in which an inactive counter is initialized or activated is addressed by the step 718, and no additional changes are made to the newly activated counter by the game-logic circuitry.

In the first state in which an award condition was met, the locked value-bearing symbols have been removed or unlocked from the symbol array and a corresponding award has been provided. As a result, the game-logic circuitry deactivates the subset counter associated with the subset that included the removed or unlocked symbols. The subset counter is reverted to an inactive state until a subsequent game outcome includes a value-bearing symbol within the associated subset, thereby initializing the subset counter at step 718.

In the second state in which one or more additional value-bearing symbols have landed within a subset associated with an active subset counter, the subset counter is adjusted to, towards, or beyond the initial count. That is, the current count of the subset counter may be incremented or decremented towards the initial count, or the current count may be set to a predefined value (including being reset to the initial count). In the example embodiment, the count may be incremented or decremented by one. In certain embodiments, the count is incremented or decremented by a value other than one. This adjustment facilitates 'streaks' that perpetuates the feature in response to positive game outcomes that continue to approach the award conditions (i.e., accruing additional value-bearing symbols in a particular subset).

Other suitable mathematical operations may be used to adjust the counter as well. The adjustments may also be based on the current count and/or other conditions. For example, the amount by which the counter increases or decreases may be at least partially a function of the current count and/or a randomly generated value. In another example, each subset may have different adjustment configurations. In other embodiments, the subset counter may remain unchanged (i.e., the current count does not change) in the second state. It is to be understood that although the foregoing adjustments were described with respect to the second state, these adjustments may be equally applicable to other states resulting in the adjustment of the subset counters.

For the third state, in contrast to the second state, if no additional value-bearing symbols are detected in a subset, then the subset counter is adjusted away from the initial counter and towards a termination count. For example, if the initial count is three and the termination count is zero, the counter may be decremented by one for each spin or outcome in which no additional value-bearing symbols are detected in the subset.

At step 726, in response to the subset counter adjustments of step 724, the game-logic circuitry determines if any of the active subset counters have met a termination count. If the termination count has been met by a subset counter, the game-logic circuitry removes or unlocks any locked value-bearing symbols from the associated subset and deactivates the subset counter at step 728. The aggregated value of the removed value-bearing symbols is not awarded at step 728. That is, in the example embodiment, the aggregated value of the locked value-bearing symbols in a subset is only awarded in response to one or more award conditions being met for that particular subset (e.g., filling the subset with value-bearing symbols). In other embodiments, at least a portion the aggregated value may be stored (at least temporarily) in a register or other suitable game element as described in one of the foregoing embodiments to facilitate 'redemption awards' through additional game features.

The game-logic circuitry concludes the current game cycle at step 730 following either a determination at step 726 that no termination count has been met by any active subset counters or in response to step 728. Subsequent game cycles may proceed according to at least some of the steps of the method 700. It is to be understood that although the steps of the method 700 have be described in a particular order, other embodiments may include additional, fewer, or alternative steps and/or reorder the described steps 702-730. For example, steps 714-728 may be reordered, and these steps may occur at any point between the outcome being generated at step 708 and concluding the game cycle at step 730.

Figure 18A:
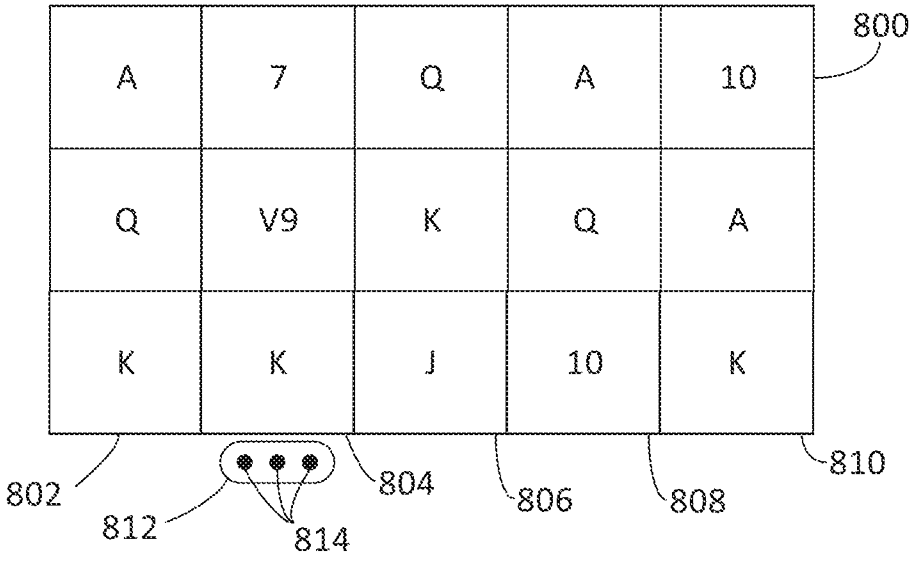
FIGS. 18A-18F are representations of a series of game cycles of a wagering game displayed on a gaming machine, according to the fourth embodiment.
Figure 18B:
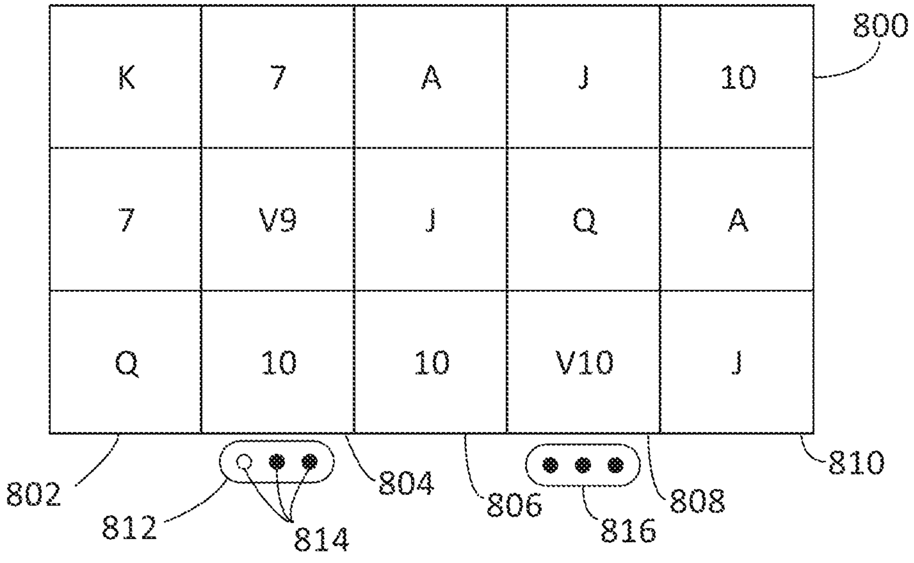
Figure 18C:
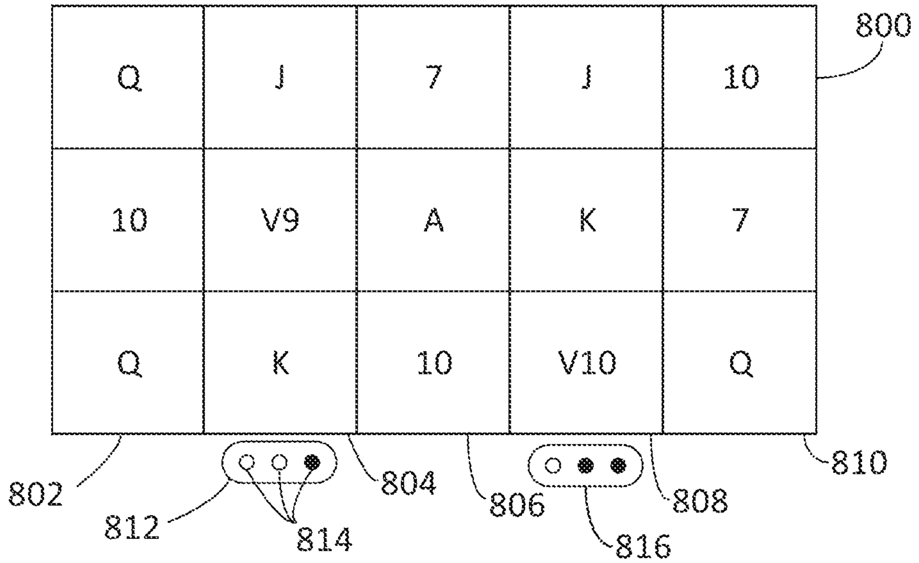
Figure 18D:
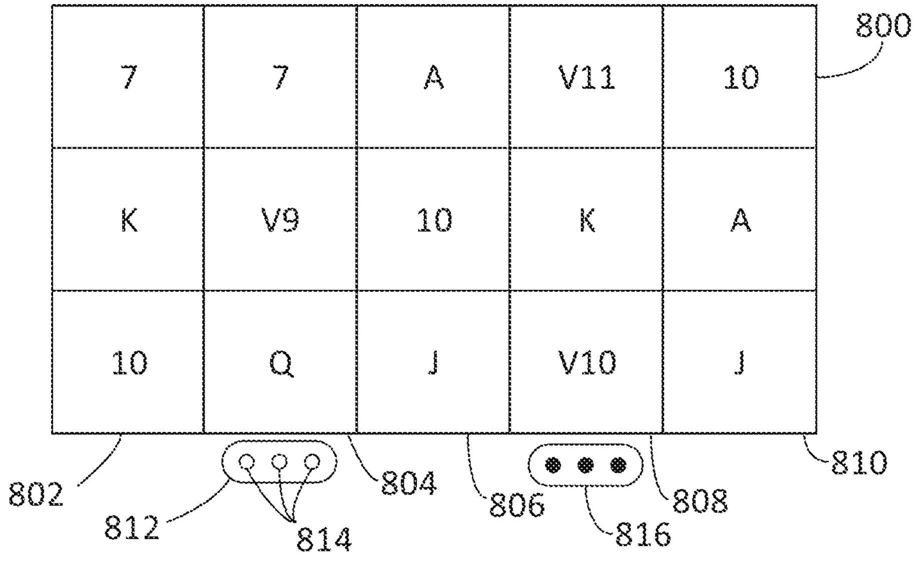
Figure 18E:
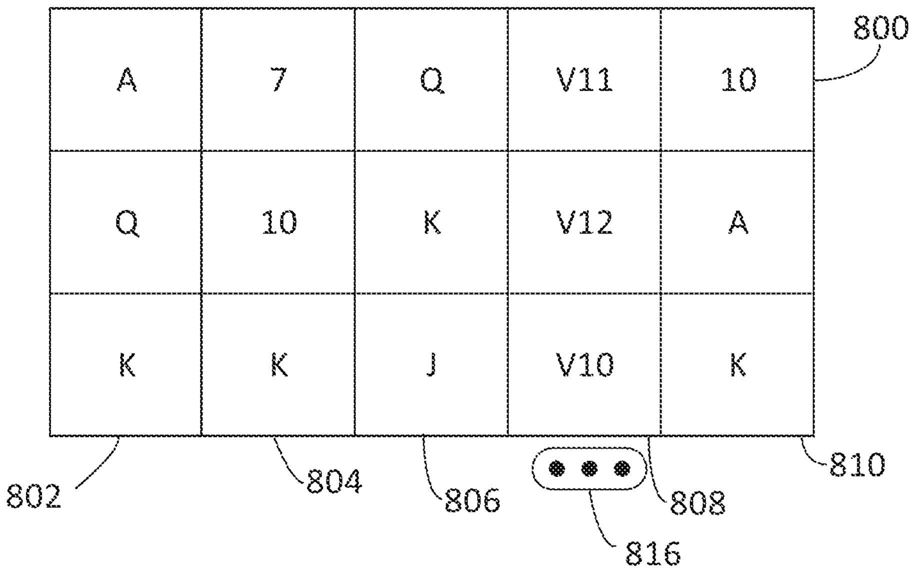
Figure 18F:
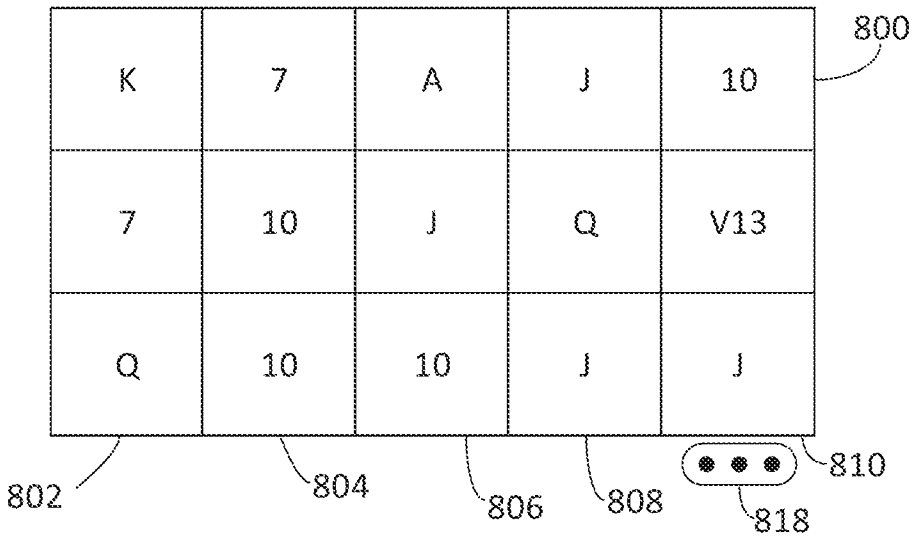

FIGS. 18A-18F depict an example game interface during play of a game implementing the game feature described in FIG. 17. More specifically, FIG. 18A depicts the interface at a first game cycle outcome, FIG. 18B depicts the interface at a second game cycle outcome, FIG. 18C depicts the interface at a third game cycle outcome, FIG. 18D depicts the interface at a fourth game cycle outcome, FIG. 18E depicts the interface at a fifth game cycle outcome, and FIG. 18F depicts the interface at a sixth game cycle outcome. The game cycles are ordered in chronological order such that the first game cycle precedes the second game cycle, which precedes the third game cycle, and so forth.

In each game cycle, a plurality of symbol-bearing reels are spun and stopped to land a plurality of symbols in a symbol array 800. The illustrated array 800 has fifteen symbol positions arranged in three rows and five columns 802, 804, 806, 808, and 810. Each column is associated with a respective reel such that each stopped reel presents three symbols. Alternatively, each symbol position may be associated with a respective independent reel such that each stopped reel presents a single symbol. The array may have more or less rows and/or columns. The number of symbol positions in each column may vary from each other. For example, the number of symbol positions in each column may be progressively increased such that the first column 802 has less symbol positions than the fifth column 810 does.

In the example embodiment, the subsets described in FIG. 17 are the columns 802, 804, 806, 808, and 810 of the symbol array 800. It is to be understood that the subsets may be defined alternatively as rows or other suitable combinations of symbol positions (including combinations that are not adjacent to each other). In certain embodiments, some of the symbol positions of the array 800 are not associated with any subset. For example, the first column 802 may not be a subset, and therefore value-bearing symbols either are not present within the reels of the first column 802 or are not locked to the first column to determine an award as described herein.

Referring to the first game cycle of FIG. 18A, the reels are spun and stopped to land a plurality of symbols in the array 800. As shown in FIG. 18A, the landed plurality of symbols include a value-bearing symbol V9 in the second column 804. Similar to the value-bearing symbols described above, the value-bearing symbol V9 includes visual value indicia (e.g., a value presented in text) indicating a value associated with the value-bearing symbol V9. The value of the value-bearing symbol V9 and other value-bearing symbols may be predefined, fixed values or dynamic values. For dynamic values, the value of each value-bearing symbol may be randomly determined and/or a function of one or more value parameters. The value parameters may include, but are not limited to, a wager amount, wager frequency, wager history, game history, player history, and/or other suitable parameters associated with the player and/or the game. In one example, as a player wagers more on each game cycle or spin, the potential value of the value-bearing symbols may increase. In certain embodiments, the identity of the particular column or subset may be a value parameter. For example, the second column 802 may include a lower average value for each value-bearing symbol relative to the average value of value-bearing symbols within the fifth column 810. In certain embodiments, the value-bearing symbols are not limited to a value amount, but may include value indicia indicating one or more progressive jackpots associated with the wagering game. That is, the value of the progressive jackpot may be awarded from a value-bearing symbol if the award conditions described herein at met.

In response to the value-bearing symbol V9 landing in the second column 804, a subset counter 812 is initialized for the second column 804. In the example interface, none of the other columns have active subset counters, and the difference between active and inactive subset counters is visually denoted by the inactive subset counters between removed from the interface. However, in other embodiments, other suitable visual characters may be used to distinguish between active and inactive counters. For example, inactive counters may be greyed-out. The subset counter 812 may undergo a transition animation to depict the change from the inactive state to active. Such a transition animation may include other elements of the interface, such as the value-bearing symbol V9 and/or the column 804.

The subset counter 812 is initialized at an initial count of three. The counter 812 is configured to count game cycle outcomes and establishes a finite window for the player to achieve the award conditions associated with the second column 804. The counter 812 includes a plurality of count indicators 814 that visually indicate the current count of the counter 812. In the example embodiment, the count indicators 814 are a series of dots in which filled-in dots represent the current count (which is three in FIG. 18A). Not only do these dots indicate the current count, but also how the current count relates to the termination count and the initial count. In other embodiments, other suitable indicators of the current count may be used, such as a text-based indicator.

The value-bearing symbol V9 is locked into the symbol array 800 such that, for one or more subsequent game cycles, the value-bearing symbol V9 occupies a symbol position irrespective of the underlying reels. That is, the locked value-bearing symbol V9 may supersede an underlying symbol from the reels in the same position, or the reels may ignore or skip the symbol position. The value-bearing symbols may be locked into the symbol positions in which the value-bearing symbols landed in or other symbol positions within the symbol array 800. For example, the value-bearing symbol V9 may be locked to the second column 804 such that the value-bearing symbol V9 may be moved to a different position within the second column 804. This may be beneficial particularly in embodiments in which paylines and/or other features of the game may need certain rows or symbol positons unoccupied by value-bearing symbols to activate. The locking process may include one or more animations to indicate to the player that the value-bearing symbol has been locked. For example, a border or background may be added to the symbol position of the locked value-bearing symbol V9 to visually distinguish the locked symbol position from other symbol positions. In another example, one or more visual characteristics (including any animation) of the value-bearing symbol V9 may be changed to indicated that the value-bearing symbol V9 has been locked.

With respect now to FIG. 18B, the second game cycle has been initiated to generate an outcome, and the symbol array 800 has been populated by a new set of symbols with the exception of the locked value-bearing symbol V9. In the second game cycle outcome, no additional value-bearing symbols have been detected in the second column 804. As a result, the subset counter 812 is decremented by one, and the count indicator 814 has been updated to indicate that the current count is two. In other embodiments, different adjustments may be made to the current count of the subset counter 812 in response to no additional value-bearing symbols being detected in the second column 804. For example, the initial count of the counter 812 may be zero or one, and the count is incremented instead of decremented. In another example, the counter 812 may be set at a value or count rather than applying arithmetic operations. The operations applied to the counter 812 may be linear (e.g., decrementing by one for each cycle without additional value-bearing symbols) or non-linear. Non-linear operations may be used, for example, in embodiments in which the count of the counter 812 is used to generate visual elements or animations like a graph for the indicator 814 or in embodiments in which the current count may have a functional relationship to one or more elements of the game, such as the value of the next value-bearing symbol.

In addition to the updated count of the column 812, the fourth column 808 includes a value-bearing symbol V10 in the second game cycle outcome. The value-bearing symbol V10 is locked to the fourth column 808, and a subset counter 816 associated with the fourth column 808 has been initialized similar to the subset counter 812 in the first game cycle outcome shown in FIG. 18A. As described herein, with respect to the value-bearing symbol feature, each column may be independent of the other columns. That is, the counter and award conditions are independent for each column. In other embodiments, value-bearing symbols, counters, and/or award conditions may be affected by the state of symbol positions of the array 800 outside of the associated column. For example, receiving an award for value-bearing symbols in one column may remove or unlock the value-bearing symbols in other columns.

FIG. 18C depicts the interface in response to an outcome being generated for the third game cycle. In the illustrated example, no additional value-bearing symbols landed in the symbol array 800. As a result, the subset counters 812, 816 have been decremented to one and two, respectively. The respective count indicators 814 have been updated to visually indicate these adjustments to the counters 812, 816 to the player.

Following the third game cycle, FIG. 18D depicts the outcome of the fourth game cycle succeeding the third game cycle. In the fourth game cycle, no additional value-bearing symbols have landed in the second column 804, thereby failing to achieve the award conditions within the period of time defined by the subset counter 812. As a result, the subset counter 812 has been decremented from one to zero. In the example embodiment, zero is the termination count for the counters. When the termination count is met by the counter 812, the value-bearing symbol feature is reset for the column 804. More specifically, the value-bearing symbol V9 is removed from the symbol array 800 and the counter 812 is also deactivated as described further in detail below with respect to FIG. 18E. It is to be understood that, in this context, 'removing' the value-bearing symbol V9 may include the removal of the value-bearing symbol prior to the next spin or game cycle or unlocking the value-bearing symbol V9 such that the symbol position is available to receive a new symbol from the next spin. The value(s) of the removed value-bearing symbols from the second column 804 are not awarded in the example embodiment. In other embodiments, other suitable game features may facilitate retrieval of at least a portion of the aggregated value of the removed value-bearing symbols.

The fourth game cycle outcome also includes a new value-bearing symbol V11 in the fourth column 808. The value-bearing symbol V11 is locked into the fourth column 808 and the subset counter 816 is reset to three (i.e., the initial count) as shown by the counter indicators 814 of the counter 816. That is, in the example embodiment, the current count of an active subset counter is reset to three in response to one or more additional value-bearing symbols irrespective of whether the current count is one, two, or three. In other embodiments, the current count is incremented or remains the same rather than reset to the initial count or another predefined value. It is to be understood that different configurations of the counters (i.e., different initial counts, terminations counts, and/or operations) may result in different specific operations applied to the current count of the subset counters. The general configuration of the example counters is that landing new value-bearing symbols causes the current count to move towards or to the initial count and away from the termination count, and vice versa for not landing any new value-bearing symbols. This general configuration incorporates 'streak' gameplay in which continually accruing positive outcomes (i.e., a "hot streak") extend play of the game feature, while repeated misses (i.e., a "cold streak") causes the game feature to end. In other embodiments, other suitable configurations of the counters may be used to regulate play of the game feature.

The fifth game cycle follows immediately after the fourth game cycle, and FIG. 18E depicts the outcome of the fifth game cycle. As described with respect to FIG. 18D, the second column 804 did not achieve the award conditions of filling every symbol position in the column 804. As a result, the value-bearing symbol V9 was removed or unlocked from the symbol array 800 and the symbol position is populated with a new symbol (which may be another value-bearing symbol). The subset counter 812 shown in FIGS. 18A-18D has been returned to an inactive state similar to the counters of the first, third, and fifth columns 802, 806, 810. In the example embodiment, the subset counter 816 of the fourth column 808 is not affected by the subset counter 812 returning to the inactive state. The inactive state of the column 812 may persist at least until one or more triggering conditions (e.g., a new value-bearing symbol in the second column 804) are detected in subsequent game cycles.

In the fourth column 808, an additional value-bearing symbol V12 has landed, thereby filling every symbol position in the column 808 with a value-bearing symbol. In the example embodiment, the award conditions have been met for the fourth column 808, and an award is provided. More specifically, the values indicated by the value indicia of the value-bearing symbols V10, V11, and V12 are combined together as an aggregated award value. In some embodiments, if one or more of the value-bearing symbols includes a progressive jackpot indicia, the jackpot value may be combined with the other awarded values.

In addition to providing an aggregated award value, the value-bearing symbols V10, V11, and V12 are removed or unlocked from the fourth column 808 for the next game cycle, and the subset counter 816 is set to an inactive state. This process is similar to the steps taken in response to a counter meeting the termination count. The difference between the two processes, in the example embodiment, being whether or not the values of the value-bearing symbols are awarded.

FIG. 18F depicts the outcome of the sixth game cycle following the fifth game cycle. The fourth column 808 has been reset as described above to await a new value-bearing symbol to activate the column time 816 (shown in FIGS. 18B-18E) again. The fifth column 810 includes a new value-bearing symbol V13, and an associated subset counter 818 is activated similar to the subset counter 812 in FIG. 18A and the subset counter 816 in FIG. 18B. Although only one or two subset counters have been active at a time in FIGS. 18A-18F, it is to be understood that any other suitable number of columns (including none and all of the columns) may have an active associated column timer on a given game cycle. In certain embodiments, a limitation may be placed on the number of columns having an active column timer on a given game cycle.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

As disclosed in the embodiments herein, awards may be provided for each game outcome based on at least the remaining symbols. For example, line pays and scatter pays may be awarded for each game cycle outcome based on the symbols populating the symbol array. In some embodiments, the value-bearing symbols may not be associated with awards outside of the features described herein. In other embodiments, the value-bearing symbols may be included within line pays, scatter pays, and/or other suitable awards. For example, the value-bearing symbols may be treated as a special symbol, such as a wild symbol.

While the embodiments are largely described within the context of a base game, it is equally contemplated that the disclosed embodiments can be practiced within the context of a free game bonus without a wager between free game cycles.

The embodiments of the present invention provide an innovative procedure for aggregating values of symbols in a symbol array. Game-logic circuitry executing instructions in accordance with the embodiments present a visual display of spinning reels with clearly enumerated symbology that combine in readily understood arrangements to increase in value. An observer experiences excitement and anticipation as new symbols land in the array and aggregate values are summed and displayed. In stark contrast to conventional reel-spinning games in which symbol images are evaluated for winning combinations by paytable rules, the disclosed embodiments provides immediately recognizable values in WYSIWYG display configurations while adding variability as to how the values to be awarded to the player are selected and accumulated.

The value-aggregation procedure may be symbol- and game-agnostic. Themes and imagery of symbols and environment may be varied with no effect on the value-aggregation process. Or, if so desired, the criteria for value-aggregation may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated—all this adds to processing overhead. Special symbols like wilds, multipliers, and scatter symbols can modify paytable values and may require separate, additional evaluation according to customized rule sets. All these procedures can be inherently more complex than simple aggregation (i.e., addition) of number values. The embodiments disclosed herein represents a win-win: simpler, almost self-explanatory graphics combined with faster, more efficient processing. The inventive value-aggregation procedure can be implemented on the vast majority of casino gaming machines without requiring upgrades or modifications.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

displaying an array of symbol positions including a plurality of subsets of one or more symbol positions and registers on an electronic display device, each subset of the plurality of subsets being associated with a respective register of the registers;

animating, via the electronic display device, a plurality of spins of symbol-bearing reels wherein, in each spin, the symbol-bearing reels are spun and stopped to land a plurality of symbols borne by the reels in the array, the plurality of symbols selectively including value-bearing symbols and reset symbols;

for each value-bearing symbol in the plurality of symbols, visually updating, via the electronic display device, the register associated with the subset of the plurality of subsets including the value-bearing symbol by adding a value borne by the value-bearing symbol to the register; and animating, by the electronic display device, the array to tag a symbol position within the subset in which the value-bearing symbol landed;

in response to tagging all the symbol positions in that subset, presenting, by the electronic display device, an award for the value in the register associated with that subset; and in response to the reset symbol landing in that subset, resetting, via the electronic display device, the award value in the register associated with that subset; and animating, by the electronic display device, the array to untag all the symbol positions in that subset.

2. The method of claim 1, wherein the symbol position tagged in response to the value-bearing symbol is the symbol position in which the value-bearing symbol position landed.

3. The method of claim 1, wherein the symbol position tagged in response to the value-bearing symbol is any untagged symbol position remaining in that subset.

4. The method of claim 1, wherein the array includes a plurality of columns, the plurality of columns being the respective subsets.

5. The method of claim 1, wherein the operation of animating the array to tag the symbol position in which the value-bearing symbol landed includes visually applying, by the electronic display device, a border, color change, background change, watermark, or other distinguishing characteristic to the symbol position.

6. The method of claim 1, wherein further in response to tagging all the symbol positions in that subset, animating, by the electronic display device, the array to untag all the symbol positions in that subset.

7. The method of claim 1, wherein the resetting operation includes resetting the value in the register associated with that subset to a variable non-zero value.

8. A gaming system comprising:

a gaming machine including an electronic display device configured to display an array of symbol positions including a plurality of subsets of one or more symbol positions and registers, each subset of the plurality of subsets being associated with a respective register of the registers; and game-logic circuitry configured to perform the operations of:

animating, via the electronic display device, a plurality of spins of symbol-bearing reels wherein, in each spin, the symbol-bearing reels are spun and stopped to land a plurality of symbols borne by the reels in the array, the plurality of symbols selectively including value-bearing symbols and reset symbols;

for each value-bearing symbol in the plurality of symbols, visually updating, via the electronic display device, the register associated with the subset of the plurality of subsets including the value-bearing symbol by adding a value borne by the value-bearing symbol to the register; and animating, by the electronic display device, the array to tag a symbol position within the subset in which the value-bearing symbol landed;

in response to tagging all the symbol positions in that subset, presenting, by the electronic display device, an award for the value in the register associated with that subset; and in response to the reset symbol landing in that subset, resetting, via the electronic display device, the award value in the register associated with that subset; and animating, by the electronic display device, the array to untag all the symbol positions in that subset.

9. The gaming system of claim 8, wherein the symbol position tagged in response to the value-bearing symbol is the symbol position in which the value-bearing symbol position landed.

10. The gaming system of claim 8, wherein the symbol position tagged in response to the value-bearing symbol is any untagged symbol position remaining in that subset.

11. The gaming system of claim 8, wherein the array includes a plurality of columns, the plurality of columns being the respective subsets.

12. The gaming system of claim 8, wherein the operation of animating the array to tag the symbol position in which the value-bearing symbol landed includes visually applying, by the electronic display device, a border, color change, background change, watermark, or other distinguishimg characteristic to the symbol position.

13. The gaming system of claim 8, wherein further in response to tagging all the symbol positions in that subset, animating, by the electronic display device, the array to untag all the symbol positions in that subset.

14. The gaming system of claim 8, wherein the resetting operation includes resetting the value in the register associated with that subset to a variable non-zero value.

15. A gaming machine comprising:

an electronic display device configured to display an array of symbol positions including a plurality of subsets of one or more symbol positions and registers, each subset of the plurality of subsets being associated with a respective register of the registers; and game-logic circuitry configured to perform the operations of:

animating, via the electronic display device, a plurality of spins of symbol-bearing reels wherein, in each spill, the symbol-bearing reels are spun and stopped to land a plurality of symbols borne by the reels in the array, the plurality of symbols selectively including value-bearing symbols and reset symbols;

for each value-bearing symbol in the plurality of symbols, visually updating, via the electronic display device, the register associated with the subset of the plurality of subsets including the value-bearing symbol by adding a value borne by the value-bearing symbol to the register; and animating, by the electronic display device, the array to tag a symbol position within the subset in which the value-bearing symbol landed;

in response to tagging all the symbol positions in that subset, presenting, by the electronic display device, an award for the value in the register associated with that subset; and in response to the reset symbol landing in that subset, resetting, via the electronic display device, the award value in the register associated with that subset; and animating, by the electronic display device, the array to untag all the symbol positions in that subset.

16. The gaming machine of claim 15, wherein the symbol position tagged in response to the value-bearing symbol is the symbol position in which the value-bearing symbol position landed.

17. The gaming machine of claim 15, wherein the symbol position tagged in response to the value-bearing symbol is any untagged symbol position remaining in that subset.

18. The gaming machine of claim 15, wherein the array includes a plurality of columns, the plurality of columns being the respective subsets.

19. The gaming machine of claim 15, wherein the operation of animating the array to tag the symbol position in which the value-bearing symbol landed includes visually applying, by the electronic display device, a border, color change, background change, watermark, or other distinguishing characteristic to the symbol position.

20. The gaming machine of claim 15, wherein further in response to tagging all the symbol positions in that subset, animating, by the electronic display device, the array to untag all the symbol positions in that subset.

21. The gaming machine of claim 15, wherein the resetting operation includes resetting the value in the register associated with that subset to a variable non-zero value.

* * * * *